(12) United States Patent
Takaoka et al.

(10) Patent No.: US 7,945,384 B2
(45) Date of Patent: May 17, 2011

(54) NAVIGATION APPARATUS AND POSITION DETECTION METHOD

(75) Inventors: Tomohisa Takaoka, Kanagawa (JP); Yoshitaka Suga, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 11/846,827

(22) Filed: Aug. 29, 2007

(65) Prior Publication Data

US 2008/0114545 A1 May 15, 2008

(30) Foreign Application Priority Data

Aug. 31, 2006 (JP) .................................. 2006-236488

(51) Int. Cl.
*G01C 21/16* (2006.01)
(52) U.S. Cl. ........................................ 701/207; 701/220
(58) Field of Classification Search ........................ None
See application file for complete search history.

(56) References Cited

U.S. PATENT DOCUMENTS 5,862,511 A * 1/1999 Croyle et al. ................. 701/213
6,816,783 B2 * 11/2004 Hashima et al. .............. 701/209
6,895,313 B2 * 5/2005 Imada et al. ...................... 701/1
2004/0254722 A1 * 12/2004 Spencer et al. ............... 701/208

FOREIGN PATENT DOCUMENTS

JP 2004-138553 5/2004

* cited by examiner

*Primary Examiner* — Michael J. Zanelli
(74) *Attorney, Agent, or Firm* — Finnegan, Henderson, Farabow, Garrett & Dunner, LLP

(57) ABSTRACT

A navigation apparatus includes: a main unit to be attached to a mobile object through a base section, the main unit detecting a current position of the mobile object based on positioning information; a section that calculates acceleration applied to the mobile object based on the mobile object's speed; an acceleration sensor that observes acceleration applied to the main unit; a section that calculates an attachment inclination of the acceleration sensor with respect to the mobile object; a section that estimates, while the positioning information is not being supplied, a speed and position of the mobile object; a section that detects whether the main unit is mounted on the base section; and a section that forces the above section to stop estimating the speed when the main unit is not mounted on the base section.

13 Claims, 9 Drawing Sheets

NAVIGATION APPARATUS AND POSITION DETECTION METHOD

CROSS REFERENCES TO RELATED APPLICATIONS

The present invention contains subject matter related to Japanese Patent Application JP2006-236488 filed it the Japanese Patent Office on Aug. 31, 2006, the entire contents of which being incorporated herein by reference.

BACKGROUND OF THE INVENTION

1. Field of the Invention

The present invention relates to a navigation apparatus and position detection method, and is preferably applied to a navigation apparatus mounted on a vehicle, for example.

2. Description of Related Art

Generally, a navigation apparatus receives from positioning means (such as a Global Positioning System (GPS) satellite) the positioning information (i.e., the GPS signals) to calculate the current position of a vehicle and then displays it on a screen. However, as disclosed in Patent Document 1 (see Jpn. Pat. Laid-open Publication No. 2004-138553), when unable to receive the GPS signals due to the vehicle running inside a tunnel or the like, the navigation apparatus calculates the vehicle's acceleration in the direction of the vehicle's motion based on data detected by an acceleration sensor and then estimates the vehicle's speed. The navigation apparatus subsequently estimates, based on the estimated speed, the current position of the vehicle, which is then displayed on a screen.

SUMMARY OF THE INVENTION

In that manner, the navigation apparatus uses the data detected by the acceleration sensor to calculate the vehicle's acceleration in the direction of the motion. However, this is possible only when an acceleration detection axis of the acceleration sensor is aligned with the direction of the vehicle's motion.

On the other hand, there is a portable navigation apparatus that can be freely brought in and taken out of the vehicle. When a user brings in and attaches the portable navigation apparatus to the vehicle, the inclination (or angle) of the portable navigation apparatus's body section (in which the acceleration sensor is installed) with respect to the vehicle may differ from those attached by other users. Accordingly, the acceleration detection axis of the acceleration sensor is not always aligned with the direction of the motion.

There might be a method in which the navigation apparatus calculates the direction of the vehicle's motion based on the GPS signals from the GPS satellite and then calculates an angular difference between the acceleration detection axis's direction, detected by the acceleration sensor, and the direction of the vehicle's motion. The angular difference data may allow the navigation apparatus to calculate the vehicle's acceleration in the direction of the motion in order to estimate the vehicle's speed and current position.

However, since the navigation apparatus can be taken out of the vehicle, the relative position and angle of the navigation apparatus's body with respect to the vehicle may vary over time. If the navigation apparatus continues to rely on the same angular difference data, the data of the vehicle's acceleration in the direction of the motion, calculated by the navigation apparatus, may be not precise enough to estimate the vehicle's speed and current position.

The present invention has been made in view of the above points and is intended to provide a navigation apparatus and position detection method that can precisely calculate the speed and current position of a mobile object even when the positioning information is not being received.

In one aspect of the present invention, a navigation apparatus includes: a main unit to be attached to a mobile object through a predetermined base section on which the main unit is mounted, the main unit detecting a current position of the mobile object based on positioning information supplied from predetermined positioning means; acceleration calculation means for calculating acceleration applied to the mobile object based on the mobile object's speed calculated based on the positioning information; an acceleration sensor for observing acceleration applied to the main unit; attachment inclination calculation means for calculating an attachment inclination of the acceleration sensor with respect to the mobile object, based on the mobile object's acceleration and the observed acceleration; speed estimate means for estimating, while the positioning information is not being supplied, a speed and position of the mobile object, based on the observed acceleration and the attachment inclination; a mounting detection section for detecting whether the main unit is mounted on the base section; and speed estimate control means for forcing the speed estimate means to stop estimating the speed when the mounting detection section detects that the main unit is not mounted on the base section.

Accordingly, the navigation apparatus can stop estimating the speed when the main unit is dismounted from the base section. This is because the inclination angle the navigation apparatus has previously learned is not appropriate for the navigation apparatus whose main unit is dismounted from the base section. The navigation apparatus therefore appropriately estimates the speed and the position.

In that manner, the navigation apparatus can stop estimating the speed when the main unit is dismounted from the base section. This is because the inclination angle the navigation apparatus has previously learned is not appropriate for the navigation apparatus whose main unit is dismounted from the base section. The navigation apparatus therefore appropriately estimates the speed and the position. Thus, the navigation apparatus and position detection method according to an embodiment of the present invention can precisely calculate the mobile object's speed and current position even when the positioning information is not being received.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

Figure 1:
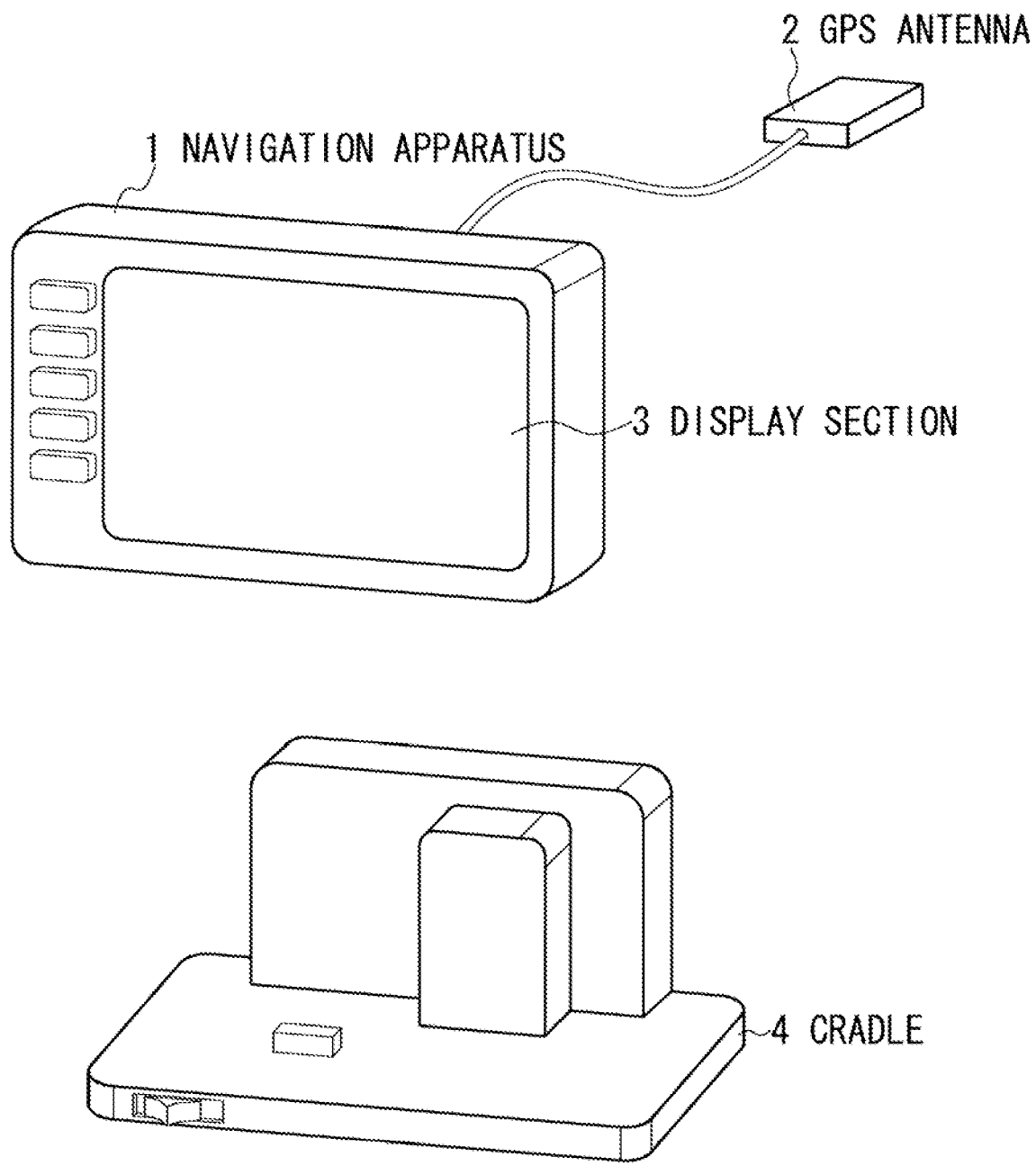
FIG. 1 is a schematic perspective view illustrating the configuration of a navigation apparatus and a cradle.

(1) Configuration of Navigation Apparatus (1-1) Appearance of Navigation Apparatus With reference to FIG. 1, a navigation apparatus 1 receives a GPS signal or the like via a GPS antenna 2 from a GPS satellite (not shown) to calculate the current position. This allows the navigation apparatus 1 to display a route to destination, the current position, a map of surroundings and the like on a display section 3.

The navigation apparatus 1 is a portable device that can be brought in and taken out of the vehicle or the user's house.

The navigation apparatus 1 is designed to be placed on a cradle (or base) 4. In addition, the navigation apparatus 1 can be taken away from the cradle 4. The cradle 4 has been previously attached to the dashboard or the like inside the vehicle. Accordingly, the navigation apparatus 1 can be freely attached to or removed from the vehicle through the cradle 4.

By the way, the GPS antenna 2 is attached to the bottom of the vehicle's windshield in order for the antenna 2 to receive the GPS signals from the GPS satellite in orbit without interference from the vehicle's body and the like.

(1-2) Circuit Configuration of Navigation Apparatus

Figure 2:
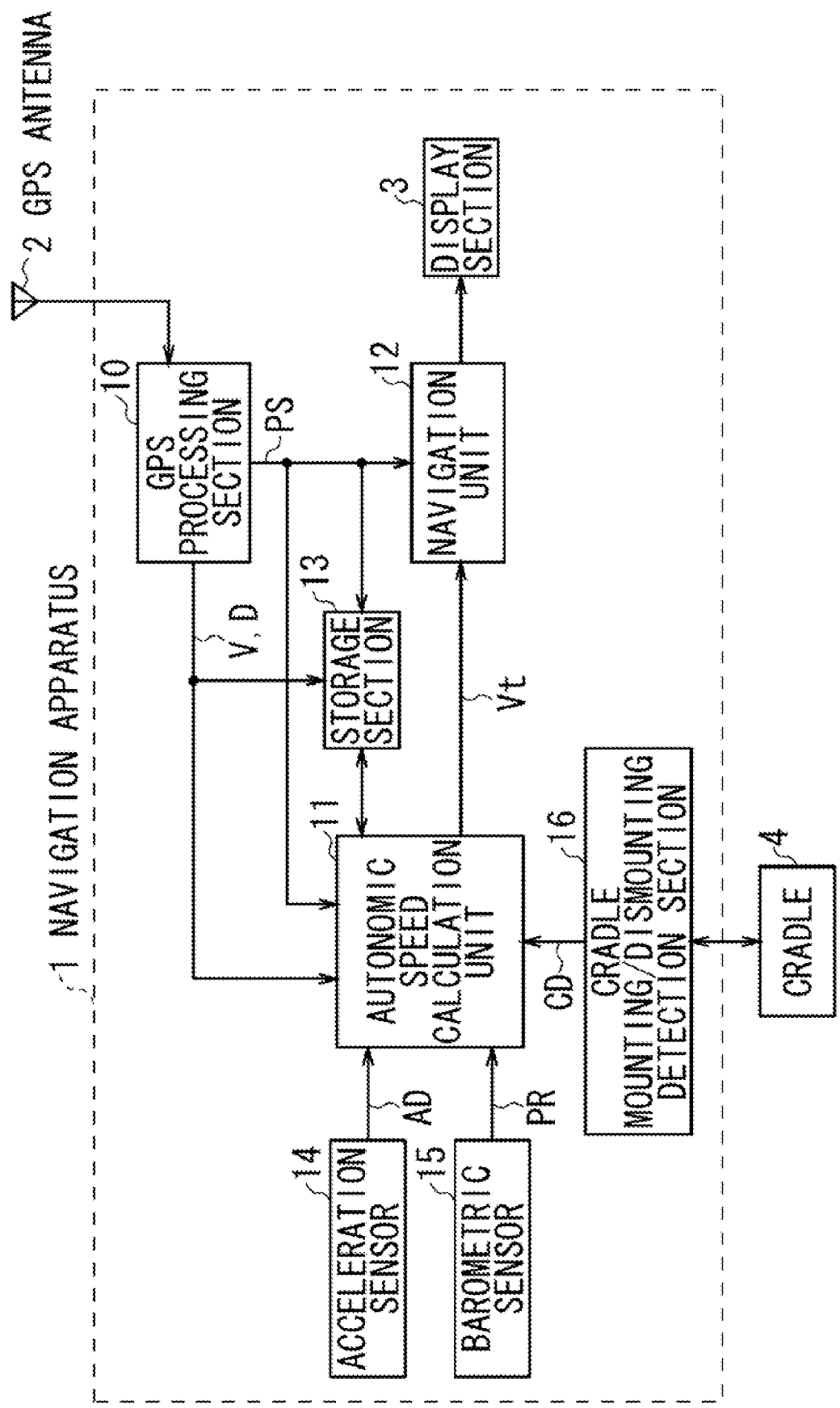
FIG. 2 is a schematic diagram illustrating the circuit configuration of a navigation apparatus.

As shown in FIG. 2, the navigation apparatus 1 includes, as well as the display section 3, the following components: a GPS processing section 10, which performs processes such as receiving the GPS signals; an arithmetic processing section 11, which calculates the speed of the vehicle based on data supplied from sensors when not receiving the GPS signals; a navigation unit 12, which generates data to be displayed on the display section 3, such as a route guidance screen, based on data supplied from the GPS processing section 10 or an autonomic speed calculation unit 11; and a storage section 13, which stores various data.

The GPS processing section 10 receives the GPS signals from the GPS satellites (not shown) via the GPS antenna 2. Based on the GPS signals, the GPS processing section 10 performs a predetermined position calculation process to generate position information PS, which is then supplied to the navigation unit 12 and the storage section 13. The GPS processing section 10 also performs, based on the GPS signals, a predetermined speed calculation process and direction calculation process to calculate the vehicle's speed data V and the vehicle's direction data D, which are then supplied to the autonomic speed calculation unit 11 and the storage section 13.

In response, the navigation unit 12 reads out from a predetermined map storage section (not shown) map data that covers the area of the position information PS. The navigation unit 12 subsequently generates display screen data including map data with a mark indicating the current position. The navigation unit 12 supplies the display screen data to the display section 3, which then displays the map with the mark.

On the other hand, the autonomic speed calculation unit 11 is connected to an acceleration sensor 14, which detects acceleration in three directions (or the directions of three axes), and a barometric sensor 15, which detects atmospheric pressure around it. The acceleration sensor 14 observes acceleration in the directions of the three axes to generate an acceleration sensor observation value AD, which is then supplied to the autonomic speed calculation unit 11. The barometric sensor 15 detects atmospheric pressure around it to generate an atmospheric pressure value PR, which is then supplied to the autonomic speed calculation unit 11.

Based on the acceleration sensor observation value AD and the atmospheric value PR, the autonomic speed calculation unit 11 calculates the vehicle's speed Vt and then stores the calculated speed data Vt in the storage section 13 such that it updates the old data. When the GPS antenna 2 is not receiving the GPS signals due to the vehicle running behind the buildings or running inside a tunnel, the autonomic speed calculation unit 11 supplies the stored speed data Vt to the navigation unit 12 to enable the navigation unit 12 to estimate the vehicle's current position (described later in detail).

Although the navigation unit 12 does not receive the position information PS from the GPS processing section 10, the navigation unit 12 estimates, based on the speed data Vt supplied from the autonomic speed calculation unit 11, the current position and then displays the estimated current position on the display section 3.

By the way, the configuration of the portable navigation apparatus 1 is different from the navigation apparatus being fixed to the vehicle. While the fixed navigation apparatus has various wires connected to the vehicle and is therefore not easy-to-use, the portable navigation apparatus 1 can be easily attached to the vehicle because the apparatus 1 does not have to use the vehicle's speed pulse signal whose interval varies according to the vehicle's speed.

In that manner, when not receiving the GPS signals via the GPS antenna 2, the autonomic speed calculation unit 11 of the navigation apparatus 1 calculates the speed Vt based on the acceleration sensor observation value AD and the atmospheric value PR. The navigation unit 12 therefore can calculate (or estimate) the current position of the vehicle.

(2) Method of Speed Calculation

Following describes how to calculate the speed Vt by the autonomic speed calculation unit 11 of the navigation apparatus 1.

(2-1) Calculation of Acceleration in the Direction of Motion

It is preferable that, to precisely calculate the vehicle's speed Vt, the real vehicle's acceleration in the direction of the vehicle's motion (also referred to as "travel direction acceleration") be detected by the autonomic speed calculation unit 11.

However, considering the fact that the navigation apparatus 1 is attached to the vehicle through the cradle 4, an acceleration detection axis of the acceleration sensor 14 may not be aligned with the direction of the vehicle's motion. In this case, the acceleration sensor observation value AD, observed by the acceleration sensor 14, may include acceleration in other directions such as the gravity acceleration g or the lateral acceleration caused by changing direction. In addition, a gain for the acceleration in the direction of the motion, detected by the acceleration sensor 14, may change.

Accordingly, if the autonomic speed calculation unit 11 uses the acceleration sensor observation value AD supplied from the acceleration sensor 14, the data of the vehicle's acceleration in the direction of the motion, detected by the autonomic speed calculation unit 11, may become less accurate.

The autonomic speed calculation unit 11 therefore performs a coordinate system transformation process between the coordinate systems of the navigation apparatus 1, vehicle and ground surface. In addition, the autonomic speed calculation unit 11 performs a division process for the components of the gravity acceleration and lateral acceleration, an offset adjustment process and the like in order to precisely calculate the vehicle's acceleration in the direction of the motion.

(2-2) Correlation Between Two Coordinate Axes

Figure 3:
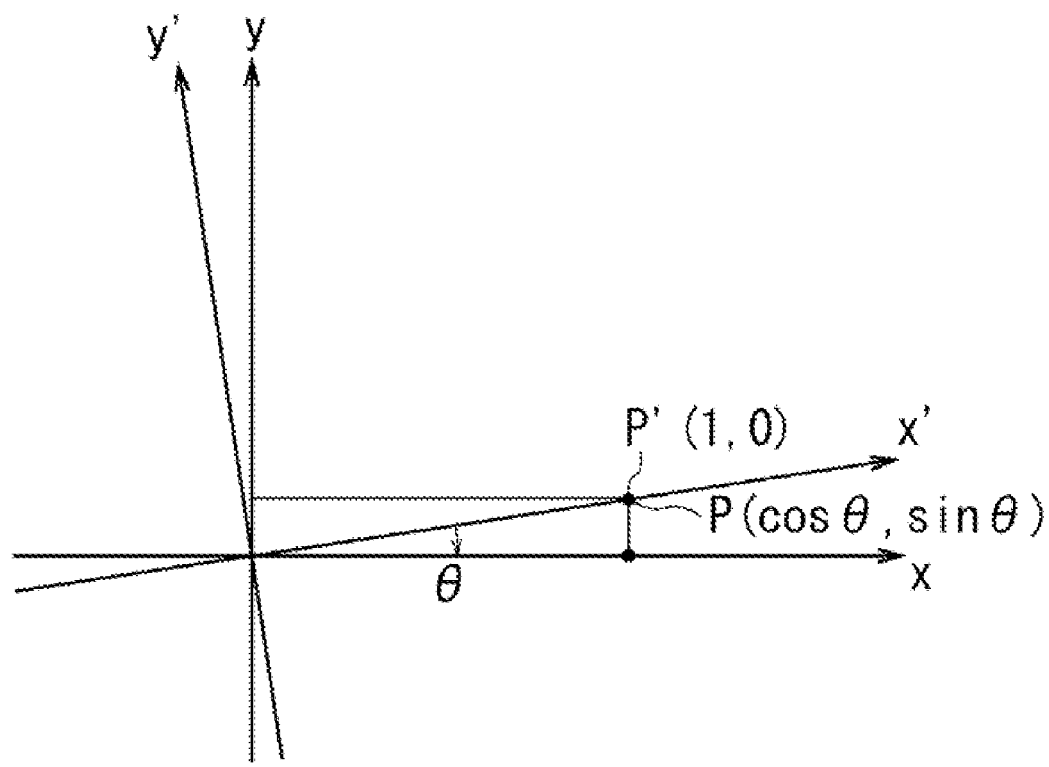
FIG. 3 is a schematic perspective view illustrating the correlation between two coordinate axes.

As shown in FIG. 3, to transform a x-y coordinate system into x'-y' coordinate system, a transformation matrix T becomes:

$$T = \begin{pmatrix} \cos\theta & -\sin\theta \\ \sin\theta & \cos\theta \end{pmatrix} \quad (1)$$

If a position p (cos θ, sin θ) in the x-y coordinate system is equivalent to a position p' (1, 0) in the x'-y' coordinate system, the following equation represents the correlation between the two coordinate systems:

$$p = Tp'$$
$$p' = T^{-1} \cdot p \quad (2)$$

Figure 4:
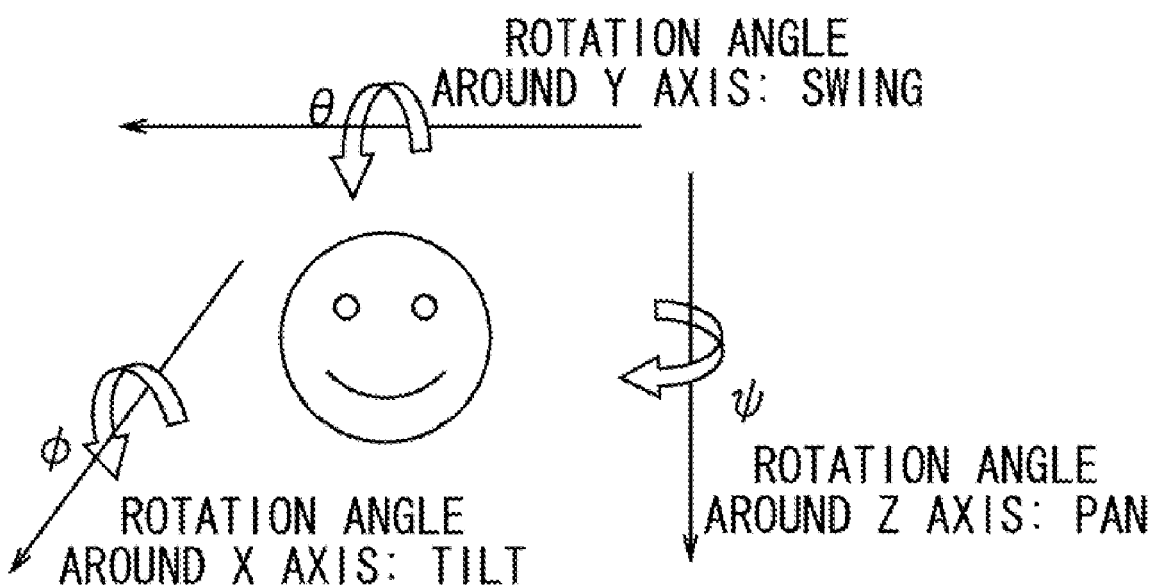
FIG. 4 is a schematic diagram illustrating definition of angles.

FIG. 4 illustrates the definition of the coordinate axes and rotation angles. When the front, rear, left, right, upper and lower of an object can be defined, an x axis represents the front-rear direction while a y axis represents the right-left direction. In addition, a z axis represents the up-down direction. A rotation angle ϕ around the x axis is referred to as a "tilt angle ϕ" while a rotation angle θ around the y axis is referred to as a "swing angle θ". In addition, a rotation angle ψ around the z axis is referred to as a "pan angle ψ".

(2-3) Correlation Between Ground Surface and Vehicle when Road is Inclined

The following describes the correlation between the ground surface and the vehicle when a road is inclined. By the way, if the road (or the ground surface) is not inclined, the x axis represents the direction of the vehicle's motion, the y axis represents the lateral (horizontal) direction perpendicular to the direction of the vehicle's motion, and the z axis represents the vertical direction or the direction of the gravity acceleration.

Figure 5:
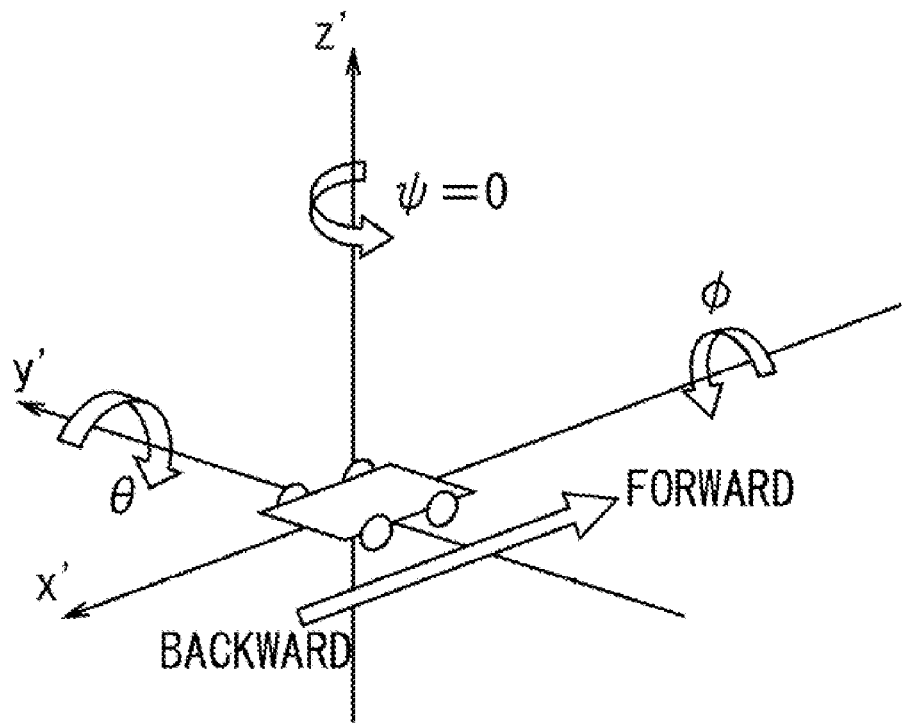
FIG. 5 is a schematic diagram illustrating a vehicle coordinate system for a vehicle on an a road, part of which is inclined.

(2-3-1) Ground Coordinate System for Ground Surface and Vehicle Coordinate System for Inclined Road FIG. 5 illustrates a vehicle coordinate system of a vehicle on an inclined road: a x' axis represents the direction of the motion of the vehicle on the inclined road, a y' axis represents the lateral (horizontal) direction perpendicular to the direction of the vehicle's motion and a z' axis represents the direction along the height of the vehicle.

In this vehicle coordinate system with x', y' and z' axes in which the vehicle is on the inclined road, when the vehicle moves along a bold arrow on the x' axis, the sign of the acceleration component in the direction of backward represents plus. When the vehicle turns right, the sign of the acceleration component in the direction of left represents plus. In addition, the upper direction of the vehicle represents the plus of the gravity acceleration. In this embodiment, the plus and minus directions are defined as the above. However, they may vary according to the conditions.

Employing the Euler angles between the ground coordinate system for ground surface (with x, y and z axes) and the vehicle coordinate system (with x', y' and z' axes) for the vehicle on the inclined road, the forward and backward inclination of the vehicle, when the vehicle is moving on the ascending and descending slopes or the slopes inclined in the direction of the motion, can be represented by the swing angle θ around the y' axis. In addition, the lateral inclinations of the vehicle, when the vehicle is moving on the descending slopes inclined in the right or left direction or in the lateral (horizontal) direction perpendicular to the direction of the motion, can be represented by the tilt angle ϕ around the x' axis. In this case, the pan angle ψ around the z' axis does not represent any inclinations of the vehicle.

(2-3-2) Coordinate Transformation Equation for Ground Surface and Vehicle

As for the ground coordinate system (with x, y and z axes) for the ground surface and the vehicle coordinate system (with x', y' and z' axes) for the vehicle on the inclined road, a transformation matrix A is defined as follows:

$$A = \begin{pmatrix} \cos\theta & 0 & -\sin\theta \\ 0 & 1 & 0 \\ \sin\theta & 0 & \cos\theta \end{pmatrix} \begin{pmatrix} 1 & 0 & 0 \\ 0 & \cos\phi & \sin\phi \\ 0 & -\sin\phi & \cos\phi \end{pmatrix} \quad (3)$$

wherein, out of the elements of the transformation matrix A, $$\begin{pmatrix} \cos\theta & 0 & -\sin\theta \\ 0 & 1 & 0 \\ \sin\theta & 0 & \cos\theta \end{pmatrix}$$

represents the swing angle θ around the y' axis or the forward and backward inclination of the ascending or descending slope in the direction of the motion, and $$\begin{pmatrix} 1 & 0 & 0 \\ 0 & \cos\phi & \sin\phi \\ 0 & -\sin\phi & \cos\phi \end{pmatrix}$$

represents the tilt angle ϕ around the x' axis or the lateral inclination of the descending slope being inclined in the right or left direction, the lateral (horizontal) direction being perpendicular to the direction of the motion.

In this case, the first element of the transformation matrix A represents the forward and backward inclination while the second element represents the lateral inclination. That is, the first element for the forward and backward inclination is multiplied by the second element for the lateral inclination as if the second element follows the first element.

Accordingly, the ground coordinate system (with x, y and z axes) becomes:

$$\begin{pmatrix} x \\ y \\ z \end{pmatrix} = A \cdot \begin{pmatrix} x' \\ y' \\ z' \end{pmatrix} \quad (4)$$

Accordingly, in the vehicle coordinate system (with x', y' and z' axes) for the vehicle on the inclined road, the gravity acceleration g becomes:

$$\begin{pmatrix} gx' \\ gy' \\ gz' \end{pmatrix} = A^{-1} \cdot \begin{pmatrix} 0 \\ 0 \\ -g \end{pmatrix} \quad (5)$$

$$= \begin{pmatrix} 1 & 0 & 0 \\ 0 & \cos\phi & \sin\phi \\ 0 & -\sin\phi & \cos\phi \end{pmatrix}^{-1} \begin{pmatrix} \cos\theta & 0 & -\sin\theta \\ 0 & 1 & 0 \\ \sin\theta & 0 & \cos\theta \end{pmatrix}^{-1} \begin{pmatrix} 0 \\ 0 \\ -g \end{pmatrix}$$

$$= \begin{pmatrix} 1 & 0 & 0 \\ 0 & \cos\phi & -\sin\phi \\ 0 & \sin\phi & \cos\phi \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix}$$

$$= \begin{pmatrix} \cos\theta & 0 & \sin\theta \\ \sin\phi\sin\theta & \cos\phi & -\sin\phi\cos\theta \\ -\cos\phi\sin\theta & \sin\phi & \cos\phi\cos\theta \end{pmatrix} \begin{pmatrix} 0 \\ 0 \\ -g \end{pmatrix}$$

$$= \begin{pmatrix} -g\sin\theta \\ g\sin\phi\cos\theta \\ -g\cos\phi\cos\theta \end{pmatrix}$$

(2-4) Vehicle and Acceleration Sensor

The following describes the correlation between the vehicle and the acceleration sensor 14 which is installed in the navigation apparatus 1 mounted on the vehicle.

Figure 6:
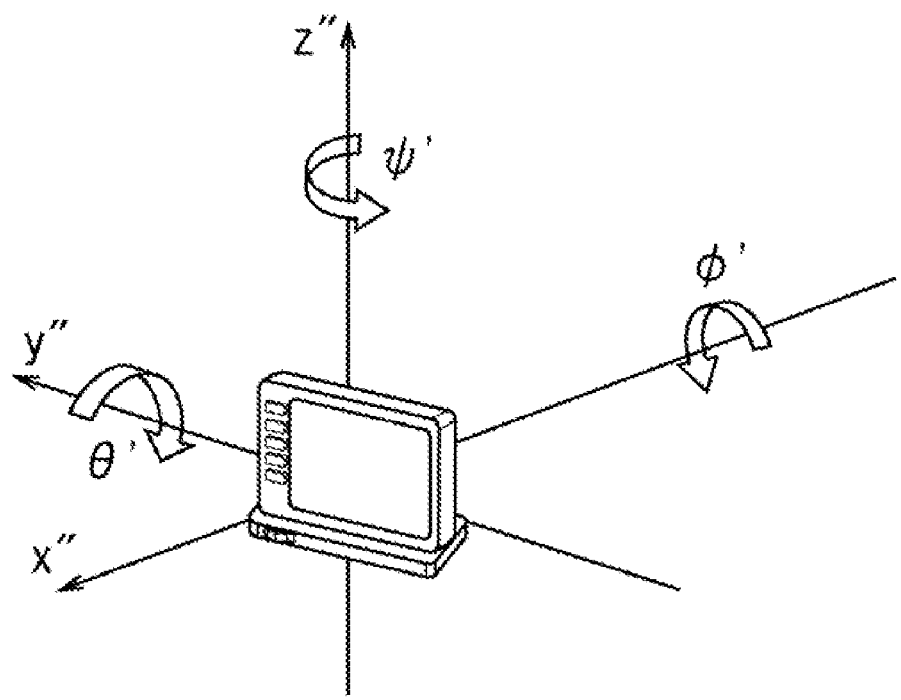
FIG. 6 is a schematic diagram illustrating a sensor coordinate system of an acceleration sensor attached to a vehicle.

(2-4-1) Vehicle Coordinate System for Vehicle and Sensor Coordinate System for Acceleration Sensor While FIG. 5 illustrates the vehicle coordinate system (with x', y' and z' axes) for the vehicle on the inclined road, FIG. 6 illustrates a sensor coordinate system for the acceleration sensor 14 (for the directions of three axes) in the navigation apparatus 1 that is attached to the vehicle at a certain angle (also referred to as an "attachment angle"). The sensor coordinate system has x", y" and z" axes.

In the sensor coordinate system (with x", y" and z" axes) for the acceleration sensor 14 in the navigation apparatus 1 attached to the vehicle, a swing angle θ' around the y" axis represents the upward or downward direction (from the user's point of view) of the navigation apparatus 1 while a tilt angle φ' around the x" axis represents the right lower or left lower direction (from the user's point of view) of the navigation apparatus 1. In addition, a par angle ψ' around the z" axis represents the direction of the navigation apparatus 1 toward the driver sitting on the right seat or toward the passenger sitting on the left seat (from the user's point of view).

(2-4-2) Coordinate Transformation Equation for Vehicle Coordinate System and Sensor Coordinate System As for the vehicle coordinate system (with x', y' and z' axes) for the vehicle on the inclined road and the sensor coordinate system (with x", y" and z" axes) for the acceleration sensor 14 for the directions of three axes, a transformation matrix B is defined ds follows:

$$B = \begin{pmatrix} 1 & 0 & 0 \\ 0 & \cos\phi' & \sin\phi' \\ 0 & -\sin\phi' & \cos\phi' \end{pmatrix} \begin{pmatrix} \cos\theta' & 0 & -\sin\theta' \\ 0 & 1 & 0 \\ \sin\theta' & 0 & \cos\theta' \end{pmatrix} \quad (6)$$

$$\begin{pmatrix} \cos\varphi' & \sin\varphi' & 0 \\ -\sin\varphi' & \cos\varphi' & 0 \\ 0 & 0 & 1 \end{pmatrix}$$

wherein, the transformation matrix B as a whole represents the attachment angle (attachment inclination) of the three axis acceleration sensor with respect to the vehicle, and, out of the elements of the transformation matrix B, $$\begin{pmatrix} \cos\theta' & 0 & -\sin\theta' \\ 0 & 1 & 0 \\ \sin\theta' & 0 & \cos\theta' \end{pmatrix}$$

represents the swing angle θ' around the y" axis or the upward and downward inclination of the attached sensor from the user's point of view, and $$\begin{pmatrix} 1 & 0 & 0 \\ 0 & \cos\phi' & \sin\phi' \\ 0 & -\sin\phi' & \cos\phi' \end{pmatrix}$$

represents the tilt angle φ' around the x" axis or the right lower and left lower inclinations of the attached sensor from the user's point of view, and $$\begin{pmatrix} \cos\varphi' & \sin\varphi' & 0 \\ -\sin\varphi' & \cos\varphi' & 0 \\ 0 & 0 & 1 \end{pmatrix}$$

represents the pan angle ψ' around the z" axis or the lateral inclination of the attached sensor facing toward the driver or passenger from the user's point of view.

In the transformation matrix B as indicated by the above (6) equation, the pan angle ψ', the swing angle θ' and the tilt angle φ' are multiplied in that order. This order is maintained in the subsequent calculations.

In this manner, the multiplication order is maintained in this embodiment (i.e., the pan angle ψ', the swing angle θ' and the tilt angle φ'). Alternatively, a different order may be applied if this applied order can be maintained: If the lateral inclination of the road is detected by using the three axes or the x", y" and z" axes the acceleration sensor 14 supports, the tilt angle φ', the swing angle θ' and the pan angle ψ' may be multiplied in that order.

With respect to the sensor coordinate system (with x", y" and z" axes) for the acceleration sensor 14, the vehicle coordinate system (with x', y' and z' axes) for the vehicle on the inclined road is expressed as follows:

$$\begin{pmatrix} x' \\ y' \\ z' \end{pmatrix} = B \cdot \begin{pmatrix} x'' \\ y'' \\ z'' \end{pmatrix} \quad (7)$$

Accordingly, transforming the above equation (7) presents the sensor coordinate system (with x", y" and z" axes) for the acceleration sensor 14 as follows:

$$\begin{pmatrix} x'' \\ y'' \\ z'' \end{pmatrix} = B^{-1} \cdot \begin{pmatrix} x' \\ y' \\ z' \end{pmatrix} \quad (8)$$

Since there is the above equation (4) as for the vehicle coordinate system (with x', y' and z' axes) for the vehicle on the inclined road, the sensor coordinate system (with x", y" and z" axes) for the acceleration sensor 14, or the equation (8), can be represented as follows:

$$\begin{pmatrix} x'' \\ y'' \\ z'' \end{pmatrix} = B^{-1} \cdot A^{-1} \cdot \begin{pmatrix} x \\ y \\ z \end{pmatrix} \quad (9)$$

Accordingly, in the sensor coordinate system (with x", y" and z" axes) for the acceleration sensor 14, the gravity acceleration g can be expressed as follows:

$$\begin{pmatrix} gx'' \\ gy'' \\ gz'' \end{pmatrix} = B^{-1} \cdot A^{-1} \cdot \begin{pmatrix} 0 \\ 0 \\ -g \end{pmatrix} = \quad (10)$$

$$\left\{ \begin{pmatrix} 1 & 0 & 0 \\ 0 & \cos\phi' & \sin\phi' \\ 0 & -\sin\phi' & \cos\phi' \end{pmatrix} \begin{pmatrix} \cos\theta' & 0 & -\sin\theta' \\ 0 & 1 & 0 \\ \sin\theta' & 0 & \cos\theta' \end{pmatrix} \begin{pmatrix} \cos\varphi' & \sin\varphi' & 0 \\ -\sin\varphi' & \cos\varphi' & 0 \\ 0 & 0 & 1 \end{pmatrix} \right\}^{-1}$$

$$\left\{ \begin{pmatrix} \cos\theta & 0 & -\sin\theta \\ 0 & 1 & 0 \\ \sin\theta & 0 & \cos\theta \end{pmatrix} \begin{pmatrix} 1 & 0 & 0 \\ 0 & \cos\phi & \sin\phi \\ 0 & -\sin\phi & \cos\phi \end{pmatrix} \right\}^{-1} \begin{pmatrix} 0 \\ 0 \\ -g \end{pmatrix} =$$

$$\begin{pmatrix} \cos\varphi' & -\sin\varphi' & 0 \\ \sin\varphi' & \cos\varphi' & 0 \\ 0 & 0 & 1 \end{pmatrix} \begin{pmatrix} \cos\theta' & 0 & \sin\theta' \\ 0 & 1 & 0 \\ -\sin\theta' & 0 & \cos\theta' \end{pmatrix} \begin{pmatrix} 1 & 0 & 0 \\ 0 & \cos\phi' & -\sin\phi' \\ 0 & \sin\phi' & \cos\phi' \end{pmatrix}$$

$$\begin{pmatrix} 1 & 0 & 0 \\ 0 & \cos\phi & -\sin\phi \\ 0 & \sin\phi & \cos\phi \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix} =$$

$$\begin{pmatrix} \cos\varphi'\cos\theta' & -\sin\varphi' & \cos\varphi'\sin\theta' \\ \sin\varphi'\cos\theta' & \cos\varphi' & \sin\varphi'\sin\theta' \\ -\sin\theta' & 0 & \cos\theta' \end{pmatrix}$$

$$\begin{pmatrix} 1 & 0 & 0 \\ 0 & \cos(\phi'+\phi) & -\sin(\phi'+\phi) \\ 0 & \sin(\phi'+\phi) & \cos(\phi'+\phi) \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix} =$$

$$\begin{pmatrix} \cos\varphi'\cos\theta' & -\sin\varphi'\cos(\phi'+\phi)+ & \sin\varphi'\sin(\phi'+\phi)+ \\ & \cos\varphi'\sin\theta'\sin(\phi'+\phi) & \cos\varphi'\sin\theta'\cos(\phi'+\phi) \\ \sin\varphi'\cos\theta' & \cos\varphi'\cos(\phi'+\phi)+ & -\cos\varphi'\sin(\phi'+\phi)+ \\ & \sin\varphi'\sin\theta'\sin(\phi'+\phi) & \sin\varphi'\sin\theta'\cos(\phi'+\phi) \\ -\sin\theta' & \cos\theta'\sin(\phi'+\phi) & \cos\theta'\cos(\phi'+\phi) \end{pmatrix}$$

$$\begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix}$$

In the above equation (10) for the gravity acceleration g, the inverse matrix $B^{-1}$ of the transformation matrix B represents the inclination of the acceleration sensor 14 with respect to the vehicle while the inverse matrix $A^{-1}$ of the transformation matrix A represents the inclination of the vehicle with respect to the ground surface.

If the acceleration sensor 14 is attached to the vehicle at a certain angle to the vehicle which is on the road at a certain angle with respect to the horizontal ground surface, the gravity acceleration g is expressed as follows:

$$\begin{pmatrix} gx'' \\ gy'' \\ gz'' \end{pmatrix} = \begin{pmatrix} \cos\varphi'\cos\theta' & -\sin\varphi'\cos(\phi'+\phi)+ & \sin\varphi'\sin(\phi'+\phi)+ \\ & \cos\varphi'\sin\theta'\sin(\phi'+\phi) & \cos\varphi'\sin\theta'\cos(\phi'+\phi) \\ \sin\varphi'\cos\theta' & \cos\varphi'\cos(\phi'+\phi)+ & -\cos\varphi'\sin(\phi'+\phi)+ \\ & \sin\varphi'\sin\theta'\sin(\phi'+\phi) & \sin\varphi'\sin\theta'\cos(\phi'+\phi) \\ -\sin\theta' & \cos\theta'\sin(\phi'+\phi) & \cos\theta'\cos(\phi'+\phi) \end{pmatrix} \quad (11)$$

$$\begin{pmatrix} -g\sin\theta \\ 0 \\ -g\cos\theta \end{pmatrix}$$

(2-4-3) Motion Acceleration for Acceleration Sensor (Acceleration in the Direction of the Motion and Lateral Acceleration)

In the sensor coordinate system (with x", y" and z" axes) for the acceleration sensor 14, the vehicle's acceleration in the direction of the vehicle's motion and lateral acceleration will also be represented as αx and αy, respectively. There may be a case in which the road is not inclined in the forward and backward direction and in the lateral direction while the acceleration sensor 14, attached to the vehicle, is inclined with respect to the vehicle. In this case, by using the inverse matrix $B^{-1}$ of the transformation matrix B, the vehicle's acceleration in the direction of the vehicle's motion (also referred to as "travel direction acceleration") αx and the lateral acceleration αy, from the viewpoint where the acceleration sensor 14 is located, are expressed as follows:

$$\begin{pmatrix} \alpha x'' \\ \alpha y'' \\ \alpha z'' \end{pmatrix} = B^{-1} \cdot \begin{pmatrix} \alpha x \\ \alpha y \\ 0 \end{pmatrix} \quad (12)$$

Accordingly, expanding the above equation (12) by using the inverse matrix $B^{-1}$ presents:

$$\begin{pmatrix} \alpha x'' \\ \alpha y'' \\ \alpha z'' \end{pmatrix} = \quad (13)$$

$$\left\{ \begin{pmatrix} 1 & 0 & 0 \\ 0 & \cos\phi' & \sin\phi' \\ 0 & -\sin\phi' & \cos\phi' \end{pmatrix} \begin{pmatrix} \cos\theta' & 0 & -\sin\theta' \\ 0 & 1 & 0 \\ \sin\theta' & 0 & \cos\theta' \end{pmatrix} \begin{pmatrix} \cos\varphi' & \sin\varphi' & 0 \\ -\sin\varphi' & \cos\varphi' & 0 \\ 0 & 0 & 1 \end{pmatrix} \right\}^{-1}$$

$$\begin{pmatrix} \alpha x \\ \alpha y \\ 0 \end{pmatrix} =$$

-continued $$\begin{pmatrix} \cos\varphi'\cos\theta' & -\sin\varphi'\cos\phi' + \cos\varphi'\sin\theta'\sin\phi' & \sin\varphi'\sin\phi' + \cos\varphi'\sin\theta'\cos\phi' \\ \sin\varphi'\cos\theta' & \cos\varphi'\cos\phi' + \sin\varphi'\sin\theta'\sin\phi' & -\cos\varphi'\sin\phi' + \sin\varphi'\sin\theta'\cos\phi' \\ -\sin\theta' & \cos\theta'\sin\phi' & \cos\theta'\cos\phi' \end{pmatrix} \begin{pmatrix} \alpha x \\ \alpha y \\ 0 \end{pmatrix} =$$

$$\begin{pmatrix} \alpha x(\cos\varphi'\cos\theta') + \alpha y(-\sin\varphi'\cos\phi' + \cos\varphi'\sin\theta'\sin\phi') \\ \alpha x(\sin\varphi'\cos\theta') + \alpha y(\cos\varphi'\cos\phi' + \sin\varphi'\sin\theta'\sin\phi') \\ \alpha x(-\sin\theta') + \alpha y(\cos\theta'\sin\phi') \end{pmatrix}$$

By the way, considering the fact that the accelerating vehicle is affected by the backward gravity and that the vehicle turning right is affected by the leftward centrifugal force, the minus or plus signs are appropriately selected for the tilt angle φ', swing angle θ' and pan angle ψ' of the acceleration sensor 14.

(2-5) Values Observed by the Acceleration Sensor

If the combination of the gravity acceleration g in the sensor coordinate system (with x", y" and z" axes) for the acceleration sensor 14 and the motion acceleration α is defined as an acceleration sensor observation value As which is observed by the acceleration sensor 14, the acceleration sensor observation value As, based on the above equations (10) and (12), can be expressed as follows:

$$\begin{pmatrix} A_s x'' \\ A_s y'' \\ A_s z'' \end{pmatrix} = \begin{pmatrix} gx'' \\ gy'' \\ gz'' \end{pmatrix} + \begin{pmatrix} \alpha x'' \\ \alpha y'' \\ \alpha z'' \end{pmatrix} = B^{-1} \left\{ A^{-1} \cdot \begin{pmatrix} 0 \\ 0 \\ -g \end{pmatrix} + \begin{pmatrix} \alpha x \\ \alpha y \\ 0 \end{pmatrix} \right\} \quad (14)$$

Expanding the above equation (14) presents the acceleration sensor observation value As in the following manner:

$$\begin{pmatrix} A_s x'' \\ A_s y'' \\ A_s z'' \end{pmatrix} = \begin{pmatrix} gx'' \\ gy'' \\ gz'' \end{pmatrix} + \begin{pmatrix} \alpha x'' \\ \alpha y'' \\ \alpha z'' \end{pmatrix} = \quad (15)$$

$$\begin{pmatrix} \cos\varphi'\cos\theta' & -\sin\varphi'\cos(\phi'+\phi) + \cos\varphi'\sin\theta'\sin(\phi'+\phi) & \sin\varphi'\sin(\phi'+\phi) + \cos\varphi'\sin\theta'\cos(\phi'+\phi) \\ \sin\varphi'\cos\theta' & \cos\varphi'\cos(\phi'+\phi) + \sin\varphi'\sin\theta'\sin(\phi'+\phi) & -\cos\varphi'\sin(\phi'+\phi) + \sin\varphi'\sin\theta'\cos(\phi'+\phi) \\ -\sin\theta' & \cos\theta'\sin(\phi'+\phi) & \cos\theta'\cos(\phi'+\phi) \end{pmatrix}$$

$$\begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix} + \begin{pmatrix} \alpha x'' \\ \alpha y'' \\ \alpha z'' \end{pmatrix} =$$

$$\begin{pmatrix} \cos\varphi'\cos\theta' & -\sin\varphi'\cos(\phi'+\phi) + \cos\varphi'\sin\theta'\sin(\phi'+\phi) & \sin\varphi'\sin(\phi'+\phi) + \cos\varphi'\sin\theta'\cos(\phi'+\phi) \\ \sin\varphi'\cos\theta' & \cos\varphi'\cos(\phi'+\phi) + \sin\varphi'\sin\theta'\sin(\phi'+\phi) & -\cos\varphi'\sin(\phi'+\phi) + \sin\varphi'\sin\theta'\cos(\phi'+\phi) \\ -\sin\theta' & \cos\theta'\sin(\phi'+\phi) & \cos\theta'\cos(\phi'+\phi) \end{pmatrix}$$

$$\begin{pmatrix} -g\sin\theta \\ 0 \\ -g\cos\theta \end{pmatrix} + \begin{pmatrix} \alpha x'' \\ \alpha y'' \\ \alpha z'' \end{pmatrix}$$

(2-5-1) Zero Point Offset and Gain of the Acceleration Sensor

As for the acceleration sensor observation value As, which is also represented by voltage, a zero point offset OF and gain GE of the acceleration sensor 14 may need to be taken into consideration.

The zero point offset OF of the acceleration sensor 14 represents the voltage values (V) being generated at the x" axis, the y" axis and the z" axis while the acceleration sensor 14 is not being affected by any acceleration components.

The gain GE of the acceleration sensor 14 represents the degree of change of the voltage (V/(m/sec$^2$)) being generated at the x" axis, the y" axis and the z" axis when there is, for example, a load of 1 g (=9.8 m/sec$^2$) on the acceleration sensor 14.

When the zero point offset OF and the gain GE are taken into consideration, the acceleration sensor observation value AD is expressed as follows, based on the above equation (14):

$$\begin{pmatrix} ADx'' \\ ADy'' \\ ADz'' \end{pmatrix} = GE \cdot \begin{pmatrix} A_s x'' \\ A_s y'' \\ A_s z'' \end{pmatrix} + OF \quad (16)$$

$$= GE \cdot B^{-1} \left( A^{-1} \cdot \begin{pmatrix} 0 \\ 0 \\ -g \end{pmatrix} + \begin{pmatrix} \alpha x \\ \alpha y \\ 0 \end{pmatrix} \right) + OF$$

wherein the unit of the acceleration sensor observation value As is m/sec$^2$ while the unit of the acceleration sensor observation value AD is V.

In that case, the zero point offset OF becomes:

$$OF = \begin{pmatrix} OFx \\ OFy \\ OFz \end{pmatrix} \quad (17)$$

Moreover, the gain GE becomes:

$$GE = \begin{pmatrix} GEx & 0 & 0 \\ 0 & GEy & 0 \\ 0 & 0 & GEz \end{pmatrix} \quad (18)$$

Accordingly, when the zero point offset OF and the gain GE are taken into consideration, the acceleration sensor observation value AD is expressed as follows:

$$\begin{pmatrix} ADx'' \\ ADy'' \\ ADz'' \end{pmatrix} = \begin{pmatrix} GEx & 0 & 0 \\ 0 & GEy & 0 \\ 0 & 0 & GEz \end{pmatrix} \begin{pmatrix} A_s x'' \\ A_s y'' \\ A_s z'' \end{pmatrix} + \begin{pmatrix} OFx \\ OFy \\ OFz \end{pmatrix} \quad (19)$$

In that case, out of the elements of the above equation (19), the following values are unknown: the gain GEx, GEy and GEz, the zero point offset OFx, OFy and OFz, the tilt angle φ', swing angle θ' and pan angle ψ' of the acceleration sensor 14 attached to the vehicle, the swing angle θ representing the forward or backward inclination of the road and the tilt angle φ representing the lateral inclination of the road.

However, the gain GEx, GEy and GEz can be determined from the specifics of the acceleration sensor 14 or by measuring the actual values. The swing angle θ representing the forward or backward inclination of the road can be calculated from the altitude information that is associated with an atmospheric pressure value PR detected by the barometric sensor 15 of the navigation apparatus 1. On the other hand, the tilt angle φ representing the lateral inclination of the road may be set at zero although this may cause some errors.

The other values, such as the gravity acceleration g, can be also calculated: The GPS signal is acquired from the GPS satellite to calculate the latitude of the current position and then the gravity acceleration g may be figured out from a latitude-gravity acceleration conversion table in which the degrees of latitude are associated with the values of the gravity acceleration.

In addition, the vehicle's travel direction acceleration αx may be calculated as a reference based on the vehicle's speed, which is calculated from the GPS signals. Moreover, the vehicle's lateral acceleration αy can be also calculated as a reference based on the direction the vehicle headed for and vehicle's speed, which are calculated from the GPS signals.

As a result, as for the above equation (19), the still unknown numbers are: the zero point offset OFx, OFy and OFz of the acceleration sensor 14; and the tilt angle φ', the swing angle θ' and the pan angle ψ', each of which indicates the attachment angle of the acceleration sensor 14 with respect to the vehicle. Those six numbers will be calculated.

(2-6) Learning of Acceleration Sensor's Attachment Angle and Zero Point Offset

Here, the acceleration sensor observation value AD is regarded as "I" while the zero point offset OFx, OFy and OFz of the acceleration sensor 14 and the gain GEx, GEy and GEz are taken into consideration. Moreover, the elements of the above equation (16) are defined as follows:

$$A^{-1} \cdot \begin{pmatrix} 0 \\ 0 \\ -g \end{pmatrix} + \begin{pmatrix} \alpha x \\ \alpha y \\ 0 \end{pmatrix} = \begin{pmatrix} Ex \\ Ey \\ Ez \end{pmatrix} = E \quad (20)$$

In this case, the above "I", or the acceleration sensor observation value AD, is expressed as follows:

$$I = GE \cdot B^{-1} \cdot E + OF \quad (21)$$

By the way, "Sθ" and "Cθ" in the equations represent sin θ and cos θ, respectively.

The inverse matrix $A^{-1}$ of the transformation matrix A in the above equation (20) represents the forward or backward inclination of the road with respect to the horizontal ground surface: This can be obtained based on the altitude information, which is associated with the atmospheric pressure value PR detected by the barometric sensor 15. In addition, the gravity acceleration g, the travel direction acceleration αx and the lateral acceleration αy can be calculated as references, as noted above. Accordingly, "E" in the above equation (21) is already known.

By using the inverse matrix $A^{-1}$ of the transformation matrix A as indicated by the above equation (3), the known "E" can be transformed into:

$$\begin{pmatrix} Ex \\ Ey \\ Ez \end{pmatrix} = A^{-1} \cdot \begin{pmatrix} 0 \\ 0 \\ -g \end{pmatrix} + \begin{pmatrix} \alpha x \\ \alpha y \\ 0 \end{pmatrix} \quad (22)$$

$$= \begin{pmatrix} C_\theta & 0 & S_\theta \\ 0 & 1 & 0 \\ -S_\theta & 0 & C_\theta \end{pmatrix} \begin{pmatrix} 0 \\ 0 \\ -g \end{pmatrix} + \begin{pmatrix} \alpha x \\ \alpha y \\ 0 \end{pmatrix}$$

$$= \begin{pmatrix} -S_\theta g + \alpha x \\ \alpha y \\ -C_\theta g \end{pmatrix}$$

Accordingly, as for the above equation (21), the still unknown numbers are: the tilt angle φ', the swing angle θ' and the pan angle ψ', each of which indicates the attachment angle of the acceleration sensor 14 with respect to the vehicle; and the zero point offset OFx, OFy and OFz of the acceleration sensor 14. The acceleration sensor observation value AD can be transformed in the following manner:

$$\begin{pmatrix} ADx'' \\ ADy'' \\ ADz'' \end{pmatrix} = \quad (23)$$

$$\begin{pmatrix} GEx & 0 & 0 \\ 0 & GEy & 0 \\ 0 & 0 & GEz \end{pmatrix} \begin{pmatrix} C_{\psi'}C_{\theta'} & -S_{\psi'}C_{\phi'}+C_{\psi'}S_{\theta'}S_{\phi'} & S_{\psi'}S_{\phi'}+C_{\psi'}S_{\theta'}C_{\phi'} \\ S_{\psi'}C_{\theta'} & C_{\psi'}C_{\phi'}+S_{\psi'}S_{\theta'}S_{\phi'} & -C_{\psi'}S_{\phi'}+S_{\psi'}S_{\theta'}C_{\phi'} \\ -S_{\theta'} & C_{\theta'}S_{\phi'} & C_{\theta'}C_{\phi'} \end{pmatrix} \begin{pmatrix} Ex \\ Ey \\ Ez \end{pmatrix} +$$

$$\begin{pmatrix} OFx \\ OFy \\ OFz \end{pmatrix} =$$

$$\begin{pmatrix} GEx\{Ex(C_{\psi'}C_{\theta'}) + Ey(-S_{\psi'}C_{\phi'}+C_{\psi'}S_{\theta'}S_{\phi'}) + Ez(S_{\psi'}S_{\phi'}+C_{\psi'}S_{\theta'}C_{\phi'})\} + OFx \\ GEy\{Ex(S_{\psi'}C_{\theta'}) + Ey(C_{\psi'}C_{\phi'}+S_{\psi'}S_{\theta'}S_{\phi'}) + Ez(-C_{\psi'}S_{\phi'}+S_{\psi'}S_{\theta'}C_{\phi'})\} + OFy \\ GEz\{Ex(-S_{\theta'}) + Ey(C_{\theta'}S_{\phi'}) + Ez(C_{\theta'}C_{\phi'})\} + OFz \end{pmatrix}$$

The above equation (23) is transformed into three function expressions fx, fy and fz for the Newton-Raphson Method as follows:

$$fx(\varphi', \theta', \phi', OFx, OFy, OFz, GEx, GEy, GEz) = \qquad (24)$$
$$ADx'' - GEx\{Ex(C_{\varphi'}C_{\theta'}) + Ey(-S_{\varphi'}C_{\phi'} + C_{\varphi'}S_{\theta'}S_{\phi'}) +$$
$$Ez(S_{\varphi'}S_{\phi'} + C_{\varphi'}S_{\theta'}C_{\phi'})\} - OFx = 0$$

$$fy(\varphi', \theta', \phi', OFx, OFy, OFz, GEx, GEy, GEz) = \qquad (25)$$
$$ADy'' - GEy\{Ex(S_{\varphi'}C_{\theta'}) + Ey(C_{\varphi'}C_{\phi'} + S_{\varphi'}S_{\theta'}S_{\phi'}) +$$
$$Ez(-C_{\varphi'}S_{\phi'} + S_{\varphi'}S_{\theta'}C_{\phi'})\} - OFy = 0$$

$$fz(\varphi', \theta', \phi', OFx, OFy, OFz, GEx, GEy, GEz) = \qquad (26)$$
$$ADz'' - GEz\{Ex(-S_{\theta'}) + Ey(C_{\theta'}S_{\phi'}) + Ez(C_{\theta'}C_{\phi'})\} - OFz = 0$$

As for those three function formulas fx, fy and fz, there are totally six unknown numbers (the zero point offset OFx, OFy and OFz, the tilt angle φ', the swing angle θ' and the pan angle ψ') in the above equations (24) to (26). This means those equations may not be able to be solved.

By the way, the known "E" in the equations (24) to (26) varies according to the GPS signals, which are acquired every second. Accordingly, at least two seconds later, six different function formulas fx1, fy1, fz1, fx2, fy2 and fz2 may be obtained as a result of change of the known "E". However, various function formulas may not be obtained unless the vehicle's speed changes. Therefore, various function formulas fx1 to fxt, fy1 to fyt and fz1 to fzt have been acquired for ten seconds during which the vehicle's speed may change.

In that case, the number of the function formulas (fx1 to fxt, fy1 to fyt and fz1 to fzt) are larger than the number of the unknown values (i.e. 6). However, considering error of detection, it seems difficult to determine the best possible answer. Accordingly, the least squares method is used to calculate values which may satisfy the unknowns of the function formulas (fx1 to fxt, fy1 to fyt and fz1 to fzt).

In this case, the multidimensional Newton Raphson method is applied. A variation δ in the basic one-dimensional Newton Raphson method is expressed as follows:

$$\delta = x_{i+1} - x_i = -\frac{f(x_i)}{f'(x_i)} \qquad (27)$$

In the Newton Raphson method, when the variation δ becomes less or equal to a predetermined convergence threshold the true answers to the unknowns are considered to have been acquired.

Transforming the above equation (27) presents:

$$f'(x_i)\delta = -f(x_i) \qquad (28)$$

Considering N dimension, that equation (28) can be also expressed as follows:

$$\begin{pmatrix} \frac{\partial f_1}{\partial x_1} & \frac{\partial f_1}{\partial x_2} & \cdots & \frac{\partial f_1}{\partial x_N} \\ \frac{\partial f_2}{\partial x_1} & \frac{\partial f_2}{\partial x_2} & \cdots & \frac{\partial f_2}{\partial x_N} \\ \vdots & \vdots & \ddots & \vdots \\ \frac{\partial f_N}{\partial x_1} & \frac{\partial f_N}{\partial x_2} & \cdots & \frac{\partial f_N}{\partial x_N} \end{pmatrix} \begin{pmatrix} \delta x_1 \\ \delta x_2 \\ \vdots \\ \delta x_N \end{pmatrix} = -\begin{pmatrix} f_1 \\ f_2 \\ \vdots \\ f_N \end{pmatrix} \qquad (29)$$

Accordingly, the variation δ is obtained based on the following equation:

$$\begin{pmatrix} \frac{\partial (f_{x1})_i}{\partial (\varphi')_i} & \frac{\partial (f_{x1})_i}{\partial (\theta')_i} & \frac{\partial (f_{x1})_i}{\partial (\phi')_i} & \frac{\partial (f_{x1})_i}{\partial (OFx)_i} & \frac{\partial (f_{x1})_i}{\partial (OFy)_i} & \frac{\partial (f_{x1})_i}{\partial (OFz)_i} \\ \frac{\partial (f_{y1})_i}{\partial (\varphi')_i} & \frac{\partial (f_{y1})_i}{\partial (\theta')_i} & \frac{\partial (f_{y1})_i}{\partial (\phi')_i} & \frac{\partial (f_{y1})_i}{\partial (OFx)_i} & \frac{\partial (f_{y1})_i}{\partial (OFy)_i} & \frac{\partial (f_{y1})_i}{\partial (OFz)_i} \\ \frac{\partial (f_{z1})_i}{\partial (\varphi')_i} & \frac{\partial (f_{z1})_i}{\partial (\theta')_i} & \frac{\partial (f_{z1})_i}{\partial (\phi')_i} & \frac{\partial (f_{z1})_i}{\partial (OFx)_i} & \frac{\partial (f_{z1})_i}{\partial (OFy)_i} & \frac{\partial (f_{z1})_i}{\partial (OFz)_i} \\ \frac{\partial (f_{x2})_i}{\partial (\varphi')_i} & \frac{\partial (f_{x2})_i}{\partial (\theta')_i} & \frac{\partial (f_{x2})_i}{\partial (\phi')_i} & \frac{\partial (f_{x2})_i}{\partial (OFx)_i} & \frac{\partial (f_{x2})_i}{\partial (OFy)_i} & \frac{\partial (f_{x2})_i}{\partial (OFz)_i} \\ \frac{\partial (f_{y2})_i}{\partial (\varphi')_i} & \frac{\partial (f_{y2})_i}{\partial (\theta')_i} & \frac{\partial (f_{y2})_i}{\partial (\phi')_i} & \frac{\partial (f_{y2})_i}{\partial (OFx)_i} & \frac{\partial (f_{y2})_i}{\partial (OFy)_i} & \frac{\partial (f_{y2})_i}{\partial (OFz)_i} \\ \frac{\partial (f_{z2})_i}{\partial (\varphi')_i} & \frac{\partial (f_{z2})_i}{\partial (\theta')_i} & \frac{\partial (f_{z2})_i}{\partial (\phi')_i} & \frac{\partial (f_{z2})_i}{\partial (OFx)_i} & \frac{\partial (f_{z2})_i}{\partial (OFy)_i} & \frac{\partial (f_{z2})_i}{\partial (OFz)_i} \\ \vdots & \vdots & \vdots & \vdots & \vdots & \vdots \end{pmatrix} \qquad (30)$$

$$\begin{pmatrix} (\delta\varphi')_i \\ (\delta\theta')_i \\ (\delta\phi')_i \\ (\delta OFx)_i \\ (\delta OFy)_i \\ (\delta OFz)_i \end{pmatrix} = -\begin{pmatrix} (f_{x1})_i \\ (f_{y1})_i \\ (f_{z1})_i \\ (f_{x2})_i \\ (f_{y2})_i \\ (f_{z2})_i \\ \vdots \end{pmatrix}$$

That is, to solve the least squares problem, the left element (partial derivatives) in the left side of the above equation (30) and its right side (function formulas) are calculated to acquire the variation δ.

By using the acquired variation δ, the answers to the unknowns can be obtained as follows:

$$\begin{pmatrix} (\varphi')_{i+1} \\ (\theta')_{i+1} \\ (\phi')_{i+1} \\ (OFx)_{i+1} \\ (OFy)_{i+1} \\ (OFz)_{i+1} \end{pmatrix} = \begin{pmatrix} (\varphi')_i \\ (\theta')_i \\ (\phi')_i \\ (OFx)_i \\ (OFy)_i \\ (OFz)_i \end{pmatrix} + \begin{pmatrix} (\delta\varphi')_i \\ (\delta\theta')_i \\ (\delta\phi')_i \\ (\delta OFx)_i \\ (\delta OFy)_i \\ (\delta OFz)_i \end{pmatrix} \qquad (31)$$

Using the answers, which are indicated in the left side of the above equation (31), the variation δ is acquired again based on the above equation (30). After that, using the acquired variation δ, the answers to the unknowns are calculated again based on the above equation (31). This process is repeated a predetermined number of time.

By the way, the initial values for the first element in the right side of the above equation (31) are:

$$\begin{pmatrix} (\varphi')_0 \\ (\theta')_0 \\ (\phi')_0 \\ (OFx)_0 \\ (OFy)_0 \\ (OFz)_0 \end{pmatrix} = \begin{pmatrix} 0[\text{rad}] \\ 0[\text{rad}] \\ 0[\text{rad}] \\ 2.5[\text{V}] \\ 2.5[\text{V}] \\ 2.5[\text{V}] \end{pmatrix} \qquad (32)$$

As for the initial values of the above equation (32), the tilt angle $(\phi')_0$, the swing angle $(\theta')_0$ and the pan angle $(\psi')_0$ are 0 deg. In addition, the zero point offset $(OFx)_0$, $(OFy)_0$ and $(OFz)_0$ are at the voltage of 2.5 v, which indicates that the acceleration sensor 14 is not affected by the acceleration.

In this case, the acceleration sensor observation value AD, detected by the acceleration sensor 14, can change within a range of 0 to 5 v in accordance with the actual acceleration detected.

The left side of the above equation (31) presents the final answer. The first element in the right side of the equation (31) represents the previous answer to the unknowns (i.e., the result of learning), calculated based on the equation (31). The second element in the right side of the equation (31) represents the variation δ of the above equation (30). Based on the left side of the equation (31), all the unknowns (the zero point offset OFx, OFy and OFz; and the tilt angle φ', the swing angle θ' and the pan angle ψ', each of which indicates the attachment angle of the acceleration sensor 14 with respect to the vehicle) are acquired.

In that manner, when the vehicle is receiving the GPS signals through the GPS antenna 2, the autonomic calculation unit 11 calculates the six unknown values: the zero point offset OFx, OFy and OFz, the tilt angle φ', the swing angle θ' and the pan angle ψ'.

During the time when the GPS signals are not received due to the vehicle running inside tunnels or the like, the autonomic speed calculation unit 11 estimates the travel direction acceleration based on the following data: the zero point offset OFx, OFy and OFz of the acceleration sensor 14; the tilt angle φ', the swing angle θ' and the pan angle ψ', each of which indicates the attachment angle of the acceleration sensor 14 with respect to the vehicle; the altitude difference of the road; and the other values observed by the acceleration sensor 14. The autonomic speed calculation unit 11 then integrates the calculated travel direction acceleration to calculate (or estimate) the vehicle's speed and current position.

By the way, a suffix "i" in the above equations (30) to (32) represents the number of repeat of the Newton Raphson calculation. That is, the right side of the above equation (30), or $(fx_1)i$, is expressed as follows:

$$(f_{x1})_i = f_{x1}((\phi')_i, (\theta')_i, (\phi')_i, (OFx)_i, (OFy)_i, (OFz)_i) \qquad (33)$$

For example, "$\partial(fx_1)i/\partial(\phi')i$" in the left element of the left side of the equation (30) is equivalent to the result of replacing "$\partial fx_1/\partial \phi$'" with "$(\phi')i$, $(\theta')i$, $(\phi')i$, $(OFx)i$, $(OFy)i$ and $(OFz)i$".

In addition, the suffix of "$fx_1$", or 1 in this case, indicates the number of seconds during which the process continues, for example for 10 seconds. Accordingly, if the process continues for 10 seconds, the left element in the left side of the equation (30) has $fx_1$ to $fx_{10}$, $fy_1$ to $fy_{10}$ and $fz_1$ to $fz_{10}$. In this case, the matrix has 30 (=3×10) lines and 6 columns.

By the way, the answers to the unknowns, obtained from the left side of the equation (31), may slightly deviate from the true answer. In addition, the true answers may change as time advances. Accordingly, in this embodiment, the apparatus is designed to repeatedly calculate the answers, for example for the last several seconds or several minutes, based on the equation (31) and then averages or smoothes the answers to obtain the final result of learning.

(2-7) Autonomic Operation by Acceleration Sensor

In a similar way to the above equation (16), the acceleration sensor observation value AD can be represented as follows:

$$\begin{pmatrix} ADx'' \\ ADy'' \\ ADz'' \end{pmatrix} = GE \cdot B^{-1} \cdot \left( A^{-1} \cdot \begin{pmatrix} 0 \\ 0 \\ -g \end{pmatrix} + \begin{pmatrix} \alpha x \\ \alpha y \\ 0 \end{pmatrix} \right) + OF \qquad (34)$$

Classifying the above equation (34) for the travel direction acceleration αx and the lateral acceleration αy presents:

$$\begin{pmatrix} \alpha x \\ \alpha y \\ 0 \end{pmatrix} = B \cdot GE^{-1} \left\{ \begin{pmatrix} ADx'' \\ ADy'' \\ ADz'' \end{pmatrix} - OF \right\} - A^{-1} \cdot \begin{pmatrix} 0 \\ 0 \\ -g \end{pmatrix} \qquad (35)$$

The transformation matrix B of the above equation (35) is expressed as follows:

$$\begin{aligned}
B &= \begin{pmatrix} 1 & 0 & 0 \\ 0 & C_{\phi'} & S_{\phi'} \\ 0 & -S_{\phi'} & C_{\phi'} \end{pmatrix} \begin{pmatrix} C_{\theta'} & 0 & -S_{\theta'} \\ 0 & 1 & 0 \\ S_{\theta'} & 0 & C_{\theta'} \end{pmatrix} \begin{pmatrix} C_{\psi'} & S_{\psi'} & 0 \\ -S_{\psi'} & C_{\psi'} & 0 \\ 0 & 0 & 1 \end{pmatrix} \\
&= \begin{pmatrix} C_{\theta'} & 0 & -S_{\theta'} \\ S_{\phi'}S_{\theta'} & C_{\phi'} & S_{\phi'}C_{\theta'} \\ C_{\phi'}S_{\theta'} & -S_{\phi'} & C_{\phi'}C_{\theta'} \end{pmatrix} \begin{pmatrix} C_{\psi'} & S_{\psi'} & 0 \\ -S_{\psi'} & C_{\psi'} & 0 \\ 0 & 0 & 1 \end{pmatrix} \\
&= \begin{pmatrix} C_{\theta'}C_{\psi'} & C_{\theta'}S_{\psi'} & -S_{\theta'} \\ S_{\phi'}S_{\theta'}C_{\psi'} - C_{\phi'}S_{\psi'} & S_{\phi'}S_{\theta'}S_{\psi'} + C_{\phi'}C_{\psi'} & S_{\phi'}C_{\theta'} \\ C_{\phi'}S_{\theta'}C_{\psi'} + S_{\phi'}S_{\psi'} & C_{\phi'}S_{\theta'}S_{\psi'} - S_{\phi'}C_{\psi'} & C_{\phi'}C_{\theta'} \end{pmatrix}
\end{aligned} \qquad (36)$$

The second element in the right side of the above equation (35) is represented as follows:

$$A^{-1} \cdot \begin{pmatrix} 0 \\ 0 \\ -g \end{pmatrix} = \begin{pmatrix} C_\theta & 0 & S_\theta \\ 0 & 1 & 0 \\ -S_\theta & 0 & C_\theta \end{pmatrix} \begin{pmatrix} 0 \\ 0 \\ -g \end{pmatrix} = \begin{pmatrix} -gS_\theta \\ 0 \\ -gC_\theta \end{pmatrix} \qquad (37)$$

Accordingly, the substitution of the equations (36) and (37) into the above equation (35) presents:

$$\frac{ADx'' - OFx}{GEx}(C_{\theta'}C_{\psi'}) + \frac{ADy'' - OFy}{GEy}(C_{\theta'}S_{\psi'}) + \qquad (38)$$
$$\frac{ADz'' - OFz}{GEz}(-S_{\theta'}) - (-gS_\theta) = \alpha x$$

$$\frac{ADx'' - OFx}{GEx}(S_{\phi'}S_{\theta'}C_{\psi'} - C_{\phi'}S_{\psi'}) + \qquad (39)$$
$$\frac{ADy'' - OFy}{GEy}(S_{\phi'}S_{\theta'}S_{\psi'} + C_{\phi'}C_{\psi'}) +$$
$$\frac{ADz'' - OFz}{GEz}(S_{\phi'}C_{\theta'}) - (gS_\phi C_\theta) = \alpha y$$

$$\frac{ADx'' - OFx}{GEx}(C_{\phi'}S_{\theta'}C_{\psi'} + S_{\psi'}S_{\phi'}) + \qquad (40)$$
$$\frac{ADy'' - OFy}{GEy}(S_{\psi'}S_{\theta'}C_{\phi'} - C_{\psi'}S_{\phi'}) +$$
$$\frac{ADz'' - OFz}{GEz}(C_{\theta'}C_{\phi'}) - (-gC_\phi C_\theta) = 0$$

To calculate the travel direction acceleration αx from the equation (38), the swing angle θ around the y' axis, indicating the forward or backward inclination of the road, may need to be calculated. This swing angle θ is represented as follows:

$$S_\theta = \sin\theta = -\frac{2\Delta H[m]}{(V_t + V_{t-1})[m/s] \cdot 1[\sec]} = -\frac{2\Delta H}{V_t + V_{t-1}} \quad (41)$$

wherein ΔH represents an altitude difference while Vt indicates speed.

What the apparatus finally wants is the speed Vt. Accordingly, the following describes how to obtain the speed Vt without calculating step by step the other unknowns such as the travel direction acceleration αx and the swing angle θ indicating the forward or backward inclination of the road.

Here, "$Vt_{-1}$" represents the previous answer of the speed, which is calculated before the final answer of the speed Vt. If the speed Vt is the speed of the vehicle at the time when its navigation apparatus has just lost the connection with the GPS, the speed $Vt_{-1}$ is equivalent to the speed Vt0, which has been calculated based on the GPS signal before losing the connection.

The known elements of the equation (38) can be collectively represented as β, and the known elements β becomes:

$$\beta = \frac{ADx'' - OFx}{GEx}(C_{\theta'}C_{\varphi'}) + \frac{ADy'' - OFy}{GEy}(C_{\theta'}S_{\varphi'}) + \frac{ADz'' - OFz}{GEz}(-S_{\theta'}) \quad (42)$$

By using that equation (42), the equation (38) can be transformed into:

$$\alpha x = \beta + gS_\theta \quad (43)$$

The correlation between the speed Vt and the travel direction acceleration αx is represented as follows:

$$V_t = V_{t-1} + \alpha x \quad (44)$$

By substituting the above equations (41) and (43), the equation (44) can be transformed into:

$$V_t = V_{t-1} + \alpha x = V_{t-1} + \beta + gS_\theta = V_{t-1} + \beta - \frac{2g\Delta H}{V_t + V_{t-1}} \quad (45)$$

Classifying the equation (45) for the speed Vt presents:

$$V_t^2 - \beta V_{t-1}^2 - \beta V_{t-1} + 2g\Delta H = 0 \quad (46)$$

Accordingly, based on the equation (46), the speed Vt is expressed as follows:

$$V_t = \frac{\beta}{2} + \sqrt{\left(\frac{\beta}{2} + V_{t-1}\right)^2 - 2g\Delta H} \quad (47)$$

In that manner, while receiving the GPS signals, the autonomic speed calculation unit 11 has previously learned the following values: the tilt angle φ', the swing angle θ' and the pan angle ψ', each of which indicates the attachment angle of the acceleration sensor 14 with respect to the vehicle; and the zero point offset OFx, OFy and OFz of the acceleration sensor 14. While not receiving the GPS signals due to the vehicle running behind the buildings or the like, the autonomic speed calculation unit 11 can autonomically calculate (or estimate) the travel direction acceleration αx based on the acceleration sensor observation values ADx", ADy" and Adz" and the attitude difference ΔH and by using the previously learned data: the tilt angle φ', the swing angle θ' and the pan angle ψ', each of which indicates the attachment angle of the acceleration sensor 14 with respect to the vehicle; and the zero point offset OFx, OFy and OFz of the acceleration sensor 14. Based on the calculated acceleration αx, the vehicle's speed (also referred to as "autonomic speed") Vt is calculated.

In addition, based on the autonomic speed Vt calculated by the autonomic speed calculation unit 11, the current position of the vehicle can be calculated by integration calculation, even when the vehicle is running inside tunnels and not receiving any GPS signals. This enables the navigation apparatus 1 to continuously display the current position on a map being displayed on the display section 3.

(3) Detailed Description of the Autonomic Speed Calculation Unit

In line with the above noted method, the autonomic speed calculation unit 11 is designed. A GPS operating mode (learning mode) and a GPS non-operating mode (autonomic mode) of the autonomic speed calculation unit 11 will be described.

(3-1) Configuration of the Autonomic Speed Calculation Unit for GPS Operating Mode (Learning Mode)

Figure 7:
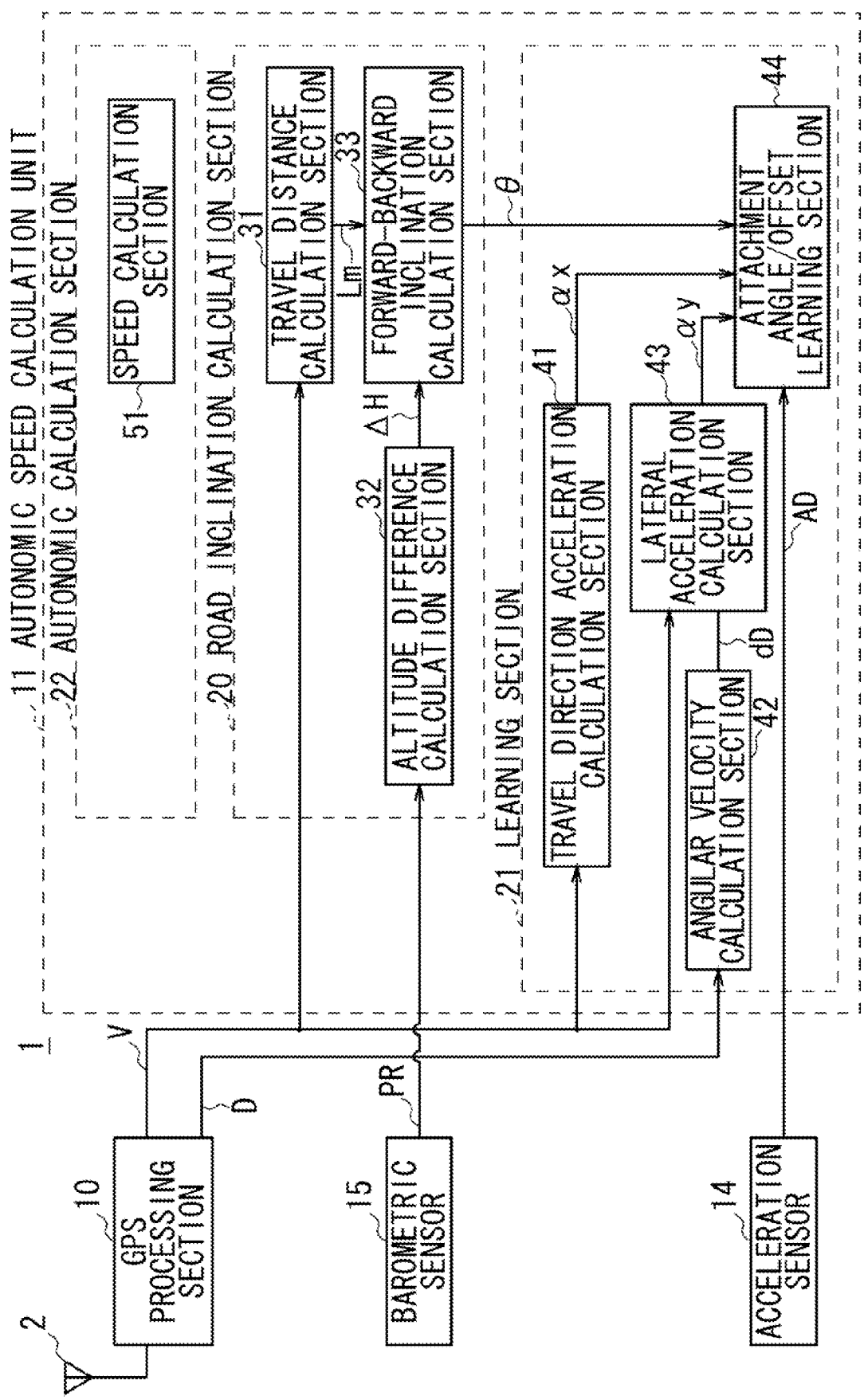
FIG. 7 is a schematic block diagram illustrating the configuration of the navigation apparatus in a GPS operating mode (learning mode)

FIG. 7 illustrates the configuration of the autonomic speed calculation unit 11. The autonomic speed calculation unit 11 includes a Central Processing Unit (CPU) (not shown). The autonomic speed calculation unit 11 reads out from a Read Only Memory (ROM) (not shown) various programs, such as a basic program and a speed calculation program, which are then loaded onto a Random Access Memory (RAM) (not shown). In this manner, the autonomic speed calculation unit 11 executes those programs to offer various software functions, such as a road inclination calculation section 20, a learning section 21 and an autonomic calculation section 22.

Alternatively, the autonomic speed calculation unit 11 may be equipped with hardware components that offer the functions of the road inclination calculation section 20, learning section 21 and autonomic calculation section 22 of the autonomic speed calculation unit 11.

The autonomic speed calculation unit 11 supplies the speed data V and direction data D, calculated by the GPS processing section 10, to the road inclination calculation section 20 and the learning section 21. In the autonomic speed calculation unit 11, the barometric sensor 15 detects atmospheric pressure to supply an atmospheric pressure value PR to the road inclination calculation section 20. On the other hand, the acceleration sensor 14 detects various values as the acceleration sensor observation value AD, which are then supplied to the learning section 21.

A travel distance calculation section 31 of the road inclination calculation section 20 calculates, based on the speed or velocity data V supplied from the GPS processing section 10, a travel distance Lm of the vehicle, which is then supplied to a forward-backward inclination calculation section 33.

An altitude difference calculation section 32 of the road inclination calculation section 20 has previously stored in the storage section 13 (FIG. 2) an atmospheric pressure/altitude table TBL in which the values of the general atmospheric pressure are associated with the values of altitude. Based on an atmospheric pressure value PR0, which is detected at a time instant t0, and an atmospheric pressure value PR1, which is detected at a time instant t1, the altitude difference calculation section 32 reads out from the atmospheric pressure/altitude table TBL altitude data h0 and h1 corresponding to the atmospheric pressure values PR0 and PR1.

The altitude difference calculation section 32 then calculates an altitude difference ΔH by calculating the difference between the vehicle's altitude data h0 (corresponding to the atmospheric pressure value PR0) and the vehicle's altitude data h1 (corresponding to the atmospheric pressure value PR1). The altitude difference calculation section 32 supplies the calculated altitude difference ΔH to the forward-backward inclination calculation section 33.

Based on the travel distance Lm supplied from the travel distance calculation section 31 and the altitude difference ΔH supplied from the altitude difference calculation section 32, the forward-backward inclination calculation section 33 calculates the swing angle θ indicating the forward or backward inclination of the road in the vehicle coordinate system (with x', y' and z' axes), which is then supplied to an attachment angle/offset learning section 44 of the learning section 21.

A travel direction acceleration calculation section 41 of the learning section 21 calculates the travel direction acceleration αx as a reference by differentiating the speed data V supplied from the GPS processing section 10. The travel direction acceleration calculation section 41 supplies the calculated acceleration αx to the attachment angle/offset learning section 44.

An angular velocity calculation section 42 calculates an angular velocity dD by differentiating the direction data D supplied from the GPS processing section 10 and then supplies the calculated angular velocity dD to a lateral acceleration calculation section 43. Based on the speed data V supplied from the GPS processing section 10 and the angular velocity dD supplied from the angular velocity calculation section 42, the lateral acceleration calculation section 43 calculates the lateral acceleration αy as reference, which is then supplied to the attachment angle/offset learning section 44.

Based on the acceleration sensor observation value AD supplied from the acceleration sensor 14, the travel direction acceleration αx supplied from the travel direction acceleration calculation section 41 and the lateral acceleration αy supplied from the lateral acceleration calculation section 43, the attachment angle/offset learning section 44 learns the following values: the zero point offset OFx, OFy and OFz of the acceleration sensor 14; and the tilt angle ϕ', the swing angle θ' and the pan angle ψ', each of which represents the attachment angle of the acceleration sensor 14 with respect to the vehicle.

Figure 8:
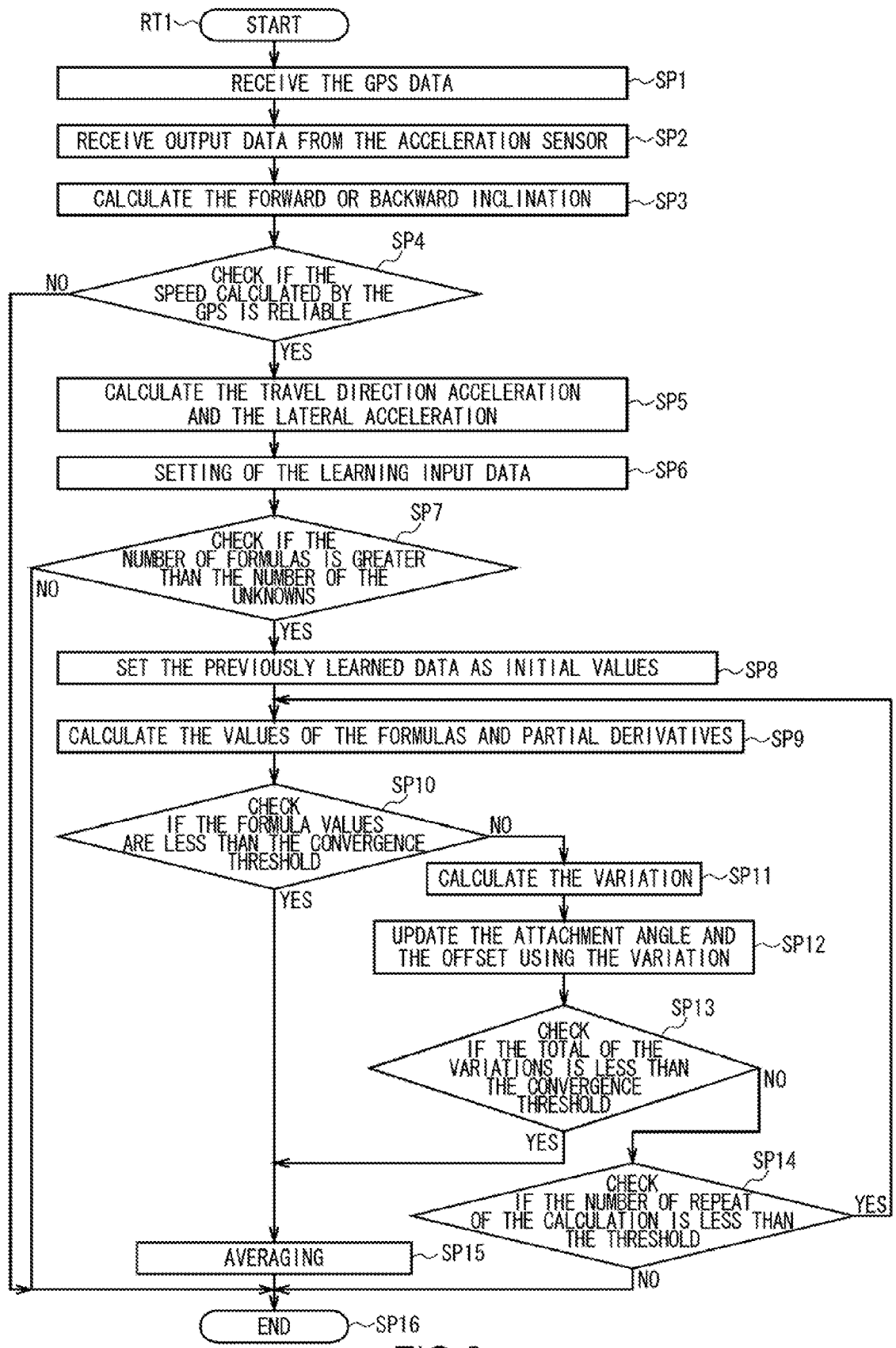
FIG. 8 is a flowchart illustrating a procedure of a learning process, performed while GPS signals are being received.

FIG. 8 illustrates a procedure of the learning process by the autonomic speed calculation unit 11 operating in the GPS operating mode. The autonomic speed calculation unit 11 starts the procedure from a start step of a routine RT1, and then proceeds to step SP1. At step SP1 in the autonomic speed calculation unit 11, the learning section 21 receives from the GPS processing section 10 GPS data including the speed data V and direction data D, which were calculated based on the GPS signals from the GPS satellites. The autonomic speed calculation unit 11 subsequently proceeds to step SP2.

At step SP2, in the autonomic speed calculation unit 11, the attachment angle/offset learning section 44 of the learning section 21 receives the acceleration sensor observation value AD from the acceleration sensor 14, and then proceeds to step SP3.

At step SP3, in the autonomic speed calculation unit 11, based on the travel distance Lm calculated by the travel distance calculation section 31 of the road inclination calculation section 20 and the altitude difference ΔH calculated by the altitude difference calculation section 32, the forward-backward inclination calculation section 33 calculates the swing angle θ indicating the forward or backward inclination of the road in the vehicle coordinate system (with x', y' and z' axes), and then proceeds to step SP4.

At step SP4, the autonomic speed calculation unit 11 checks if the speed information V, obtained at step SP1, is reliable or not, based on a flag attached to the speed information V. If the autonomic speed calculation unit 11 determines that it is unreliable, the autonomic speed calculation unit 11 proceeds to step SP16 to end the process.

Whereas if the autonomic speed calculation unit 11 determines that it is reliable, the autonomic speed calculation unit 11 proceeds to step SP5. At step SP5, the travel direction acceleration calculation section 41 calculates, based on the speed data V supplied from the GPS processing section 10, the travel direction acceleration αx as a reference while the lateral acceleration calculation section 43 calculates, based on the speed data V supplied from the GPS processing section 10 and the direction data D, the lateral acceleration αy as a reference. The autonomic speed calculation unit 11 subsequently proceeds to step SP6.

At step SP6, the autonomic speed calculation unit 11 sets the acceleration sensor observation value AD and the known "E" (indicated by the above equation (22)) as learning input data. The autonomic speed calculation unit 11 subsequently proceeds to step SP7.

At step SP7, the autonomic speed calculation unit 11 compares the number of the unknown values with the number of the function formulas that are used to calculate the zero point offset OFx, OFy and OFz of the acceleration sensor 14 and the tilt angle ϕ', swing angle θ' and pan angle ψ' representing the attachment angle of the acceleration sensor 14 with respect to the vehicle, in order to check if the function formulas outnumber the unknown values.

If the number of the function formulas is less than the number of the unknown values, then this means the unknown numbers may not be able to be calculated. In this case, the autonomic speed calculation unit 11 proceeds to step SP16 to end the process.

Whereas if the number of the function formulas is greater than the number of the unknown values, then this means the unknown numbers can be calculated. In this case, the autonomic speed calculation unit 11 proceeds to step SP8.

At step SP8, the autonomic speed calculation unit 11 sets the previously learned data (learned by the routine RT1) into the left element in the left side of the above equation (30) as initial setting: The previously learned data include the zero point offset OFx, OFy and OFz of the acceleration sensor 14 and the tilt angle ϕ', swing angle θ' and pan angle ψ' representing the attachment angle of the acceleration sensor 14 with respect to the vehicle. The autonomic speed calculation unit 11 subsequently proceeds to step SP9.

At step SP9, the autonomic speed calculation unit 11 calculates the values (partial derivatives) of the left element in the left side of the above equation (30) and its right side's values (function values), and then proceeds to step SP10.

At step SP10, the autonomic speed calculation unit 11 checks if the total of the values in the right side of the equation (30) is less than a predetermined convergence threshold. If it determines that the total of the values is less than the predetermined convergence threshold, the autonomic speed calculation unit 11 proceeds to step SP15. If not so, the autonomic speed calculation unit 11 proceeds to step SP11.

At step SP11 the autonomic speed calculation unit 11 calculates the variations δ of the right element in the left side of the equation (30) based on the partial derivatives and function values calculated at step SP9, since the total of the values in the right side of the equation (30) is greater or equal to the Newton-Raphson method's convergence threshold. The autonomic speed calculation unit 11 subsequently proceeds to step SP12.

At step SP12, by using the variation δ calculated at step SP11, the autonomic speed calculation unit 11 calculates the final answers, which are equivalent to the left side of the equation (31): The final answers include the zero point offset OFx, OFy and OFz of the acceleration sensor 14 and the tilt angle φ', swing angle θ' and pan angle ψ' representing the attachment angle of the acceleration sensor 14 with respect to the vehicle. The autonomic speed calculation unit 11 subsequently proceeds to step SP13.

At step SP13, the autonomic speed calculation unit 11 check if the total of the elements (the variation values δ) of the right element in the left side of the equation (30) is less than a predetermined convergence threshold. If it determines that the total of the elements is less than a predetermined convergence threshold, the autonomic speed calculation unit 11 proceeds to step SP15. If not so, the autonomic speed calculation unit 11 proceeds to step SP14.

At step SP14, the autonomic speed calculation unit 11 check if the number of repeat of the Newton-Raphson calculation (equivalent to the process of SP9 to SP14) reaches a predetermined repeat threshold. If it determines that the Newton-Raphson calculation has not been repeated more than the predetermined number of times yet (which means it has not reached the predetermined repeat threshold yet), the autonomic speed calculation unit 11 returns to step SP9 to repeat the process. In this case, the autonomic speed calculation unit 11, at step SP9, calculates the values (partial derivatives) of the left element in the left side of the above equation (30) and its right side's values (function values) based on the previous results of calculation including the zero point offset OFx, OFy and OFz of the acceleration sensor 14 and the tilt angle φ', swing angle θ' and pan angle ψ' representing the attachment angle of the acceleration sensor 14 with respect to the vehicle.

Whereas if it determines at step SP14 that the Newton-Raphson calculation has been already repeated more than the predetermined number of times, then this means that, at step SP10 or step SP13, the total of the values of the function formulas or the total of the elements (the variation values δ) was not converged despite the fact that the Newton-Raphson calculation has been repeated the predetermined number of times. In this case, the autonomic speed calculation unit 11 proceeds to step SP16 to end the process without trying to solve the unknowns.

At step SP15, the autonomic speed calculation unit 11 calculates the final answers of the last several seconds or the last several minutes from the left side of the equation (31), and then smoothes the calculated final answers to acquire a value, which can be considered to be a true answer, as the final result of learning. The autonomic speed calculation unit 11 subsequently proceeds to step SP16 to end the process.

Instead of smoothing the final answers at step SP15, the autonomic speed calculation unit 11 may calculate an average of the final answers to reduce calculation load.

(3-2) Configuration of Autonomic Speed Calculation Unit for GPS Non-Operating Mode (Autonomic Mode)

Figure 9:
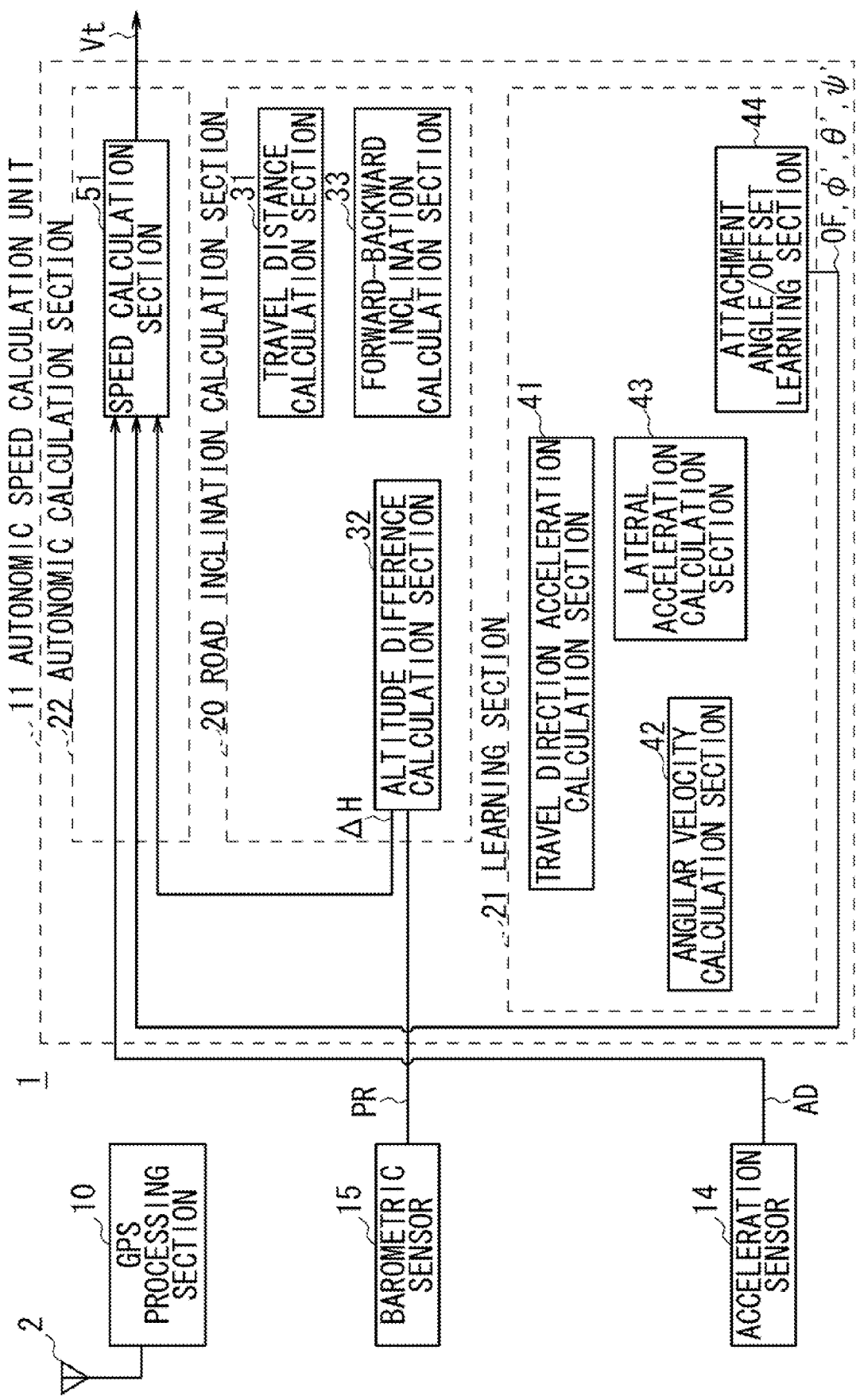
FIG. 9 is a schematic block diagram illustrating the configuration of the navigation apparatus in a GPS non-operating mode (autonomic mode)

FIG. 9 illustrates the configuration of the autonomic speed calculation unit 11 when not receiving the GPS signals due to the vehicle running inside tunnels or the like. In this case, the GPS processing section 10 does not offer the speed data V and the direction data D. The barometric sensor 15 supplies the atmospheric pressure value PR to the altitude difference calculation section 32 of the road inclination calculation section 20 while the acceleration sensor 14 supplies the acceleration sensor observation value AD to a speed calculation section 51 of the autonomic calculation section 22.

The altitude difference calculation section 32 of the road inclination calculation section 20 calculates, based on the atmospheric pressure/altitude table TBL, the altitude difference ΔH, which is a difference between the vehicle's altitude at the time instant t0 (associated with the atmospheric pressure value PR0 in the table) and the vehicle's altitude at the time instant t1 (associated with the atmospheric pressure value PR1). The altitude difference calculation section 32 subsequently supplies the calculated altitude difference ΔH to the speed calculation section 51 of the autonomic calculation section 22.

On the other hand, the attachment angle/offset learning section 44 of the learning section 21 supplies what it has learned before by receiving the GPS signals to the speed calculation section 51 of the autonomic calculation section 22: What the learning section 21 has learned include the zero point offset OFx, OFy and OFz of the acceleration sensor 14 and the tilt angle φ', swing angle θ' and pan angle ψ' representing the attachment angle of the acceleration sensor 14 with respect to the vehicle.

Using the equations (47) and the like, the speed calculation section 51 autonomically calculates (or estimates) the travel direction acceleration αx in order to calculate (or estimate) the vehicle's autonomic speed Vt, based on the following data: the altitude difference ΔH supplied from the altitude difference calculation section 32; the acceleration sensor observation value AD supplied from the acceleration sensor 14; and the previously learned data (the zero point of set OFx, OFy and OFz of the acceleration sensor 14 and the tilt angle φ', swing angle θ' and pan angle ψ' representing the attachment angle of the acceleration sensor 14 with respect to the vehicle) supplied from the attachment angle/offset learning section 44.

The navigation unit 12 therefore can calculate the current position of the vehicle by integrating the vehicle's autonomic speed Vt. Accordingly, the navigation unit 12 can display the vehicle's current position on a map being displayed on the display section 3 even when not receiving the GPS signals.

Figure 10:
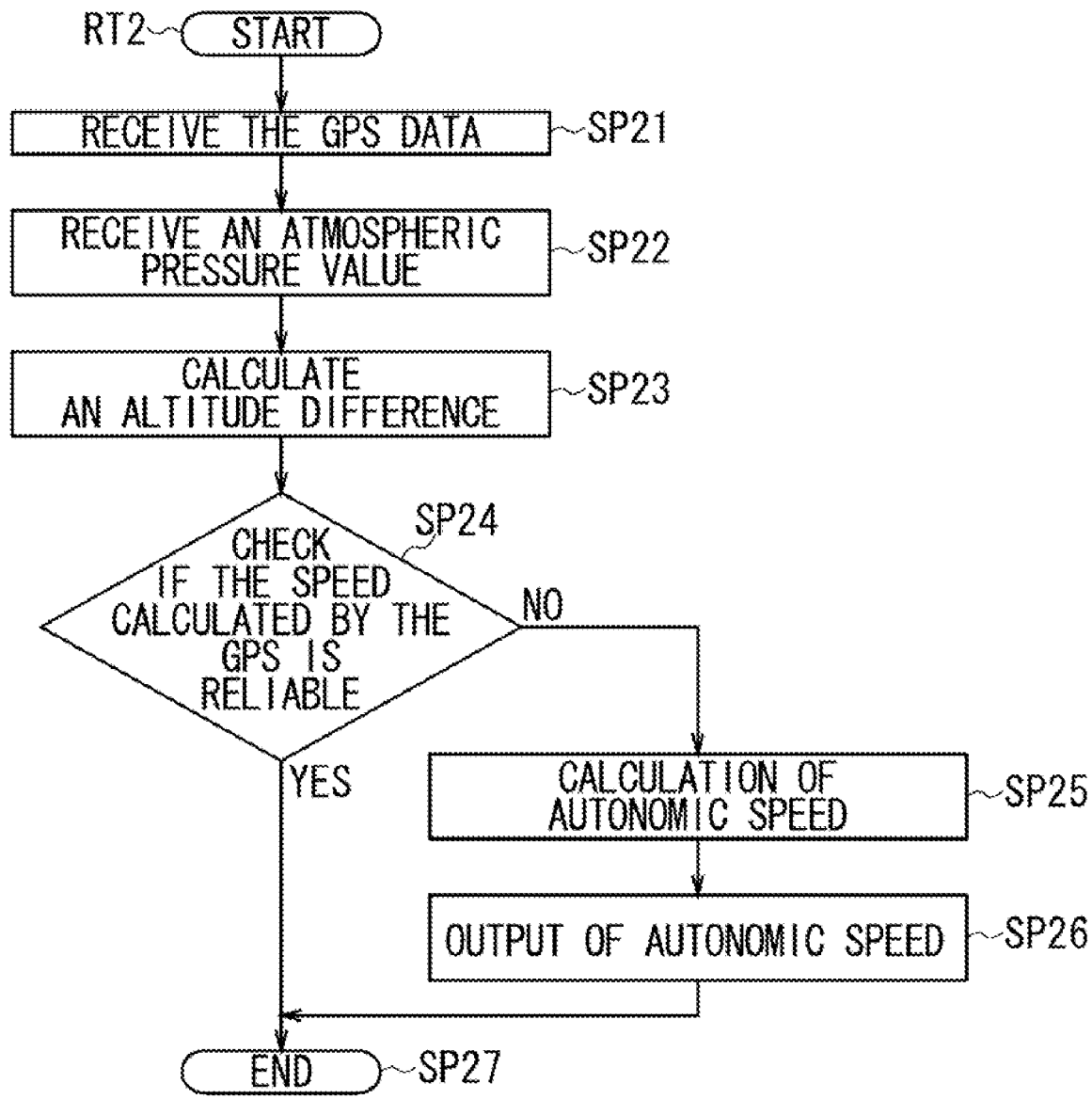
FIG. 10 is a flowchart illustrating a procedure of an autonomic speed calculation process.

FIG. 10 illustrates a procedure of the autonomic speed calculation process by the autonomic speed calculation unit 11 operating in the GPS non-operating mode. The autonomic speed calculation unit 11 starts the routine RT2 from start step and then proceeds to step SP21. At step SP21, in the autonomic speed calculation unit 11, after calculating the vehicle's speed data V and the direction data D based on the GPS signals from the GPS satellites, the GPS processing section 10 supplies the speed data V and the direction data D to the learning section 21 as GPS data. The autonomic speed calculation unit 11 subsequently proceeds to step SP22.

At step SP22, in the autonomic speed calculation unit 11, the barometric sensor 15 supplies the atmospheric pressure value PR to the altitude difference calculation section 32 of the road inclination calculation section 20. The autonomic speed calculation unit 11 subsequently proceeds to step SP23.

At step SP23, in the autonomic speed calculation unit 11, the altitude difference calculation section 32 calculates the altitude difference ΔH based on the atmospheric pressure/altitude table TBL. The autonomic speed calculation unit 11 subsequently proceeds to step SP24.

At step SP24, the autonomic speed calculation unit 11 checks if the speed information V, obtained at step SP21, is reliable or not, based on a flag attached to the speed information V. If the autonomic speed calculation unit 11 determines that it is reliable, then this means that the apparatus is receiving the real GPS signals and there is no need to continue the autonomic speed calculation process. In this case, the autonomic speed calculation unit 11 proceeds to step SP27 to end the process.

Whereas if the autonomic speed calculation unit 11 determines that it is unreliable, then this means that the apparatus is not receiving the GPS signals. In this case, the autonomic speed calculation unit 11 proceeds to step SP25.

At step SP25, since it is not receiving the GPS signals, the autonomic speed calculation unit 11 estimates, by using the above equations (43) and the like, the travel direction acceleration αx in order to calculate the vehicle's autonomic speed Vt by integration calculation, based on what it has learned before by receiving the GPS signals (i.e. the zero point offset OFx, OFy and OFz of the acceleration sensor 14 and the tilt angle φ', swing angle θ' and pan angle ψ' representing the attachment angle of the acceleration sensor 14 with respect to the vehicle). The autonomic speed calculation unit 11 subsequently proceeds to step SP26.

At step SP26, the autonomic speed calculation unit 11 outputs the calculated autonomic speed data Vt to the navigation unit 12 and then proceeds to step SP27 to end the process.

In response, the navigation unit 12 estimates the vehicle's current position based on the autonomic speed data Vt and then displays it on a map being displayed on the display section 3 even when not receiving the GPS signals.

(4) Navigation Apparatus, Mounting and Dismounting to Cradle and Use of the Learned Data (4-1) Detection of Mounting and Dismounting and Calculation of Autonomic Speed As noted above, the navigation apparatus 1 (FIG. 1) can be easily mounted on or dismounted from the cradle 4 that is attached to the vehicle.

Accordingly, the following situation is expected to happen: A user takes away the navigation apparatus 1 from the cradle 4, holds the navigation apparatus 1 to input his/her destination or the like, and then places the navigation apparatus 1 back to the cradle 4.

After the navigation apparatus 1 is dismounted from the cradle 4, a relative angle between the vehicle and the navigation apparatus 1, or the attachment angle (the tilt angle φ', swing angle θ' and pan angle ψ') of the acceleration sensor 14, may differ from when the navigation apparatus 1 is placed on the cradle 4.

In the above case, the sensor coordinate system, defined by the equation (6), is based on the premise that the navigation apparatus 1 and its acceleration sensor 14 are firmly fixed to the vehicle.

Accordingly, while the GPS signals are not received via the GPS antenna 2 by the navigation apparatus 1 after the navigation apparatus 1 is dismounted from the cradle 4, the autonomic speed calculation unit 11 (FIG. 2) of the navigation apparatus 1 has difficulty in calculating the autonomic speed Vt because the autonomic speed calculation unit 11 may not be able to use the previously learned data such as the attachment angle of the acceleration sensor 14 (the tilt angle φ', swing angle θ' and pan angle ψ').

Therefore, the navigation apparatus 1 is designed to detect whether the navigation apparatus 1 is attached to the cradle 4 in order for the autonomic speed calculation unit 11 to select an appropriate calculation method of the autonomic speed Vt.

In reality, the navigation apparatus 1 has a cradle mounting/dismounting detection section 16 to detect whether the navigation apparatus 1 is mounted on or dismounted from the cradle 4 and then supplies the resultant mounting/dismounting information CD to the autonomic speed calculation unit 11.

If the autonomic speed calculation unit 11 recognizes, based on the supplied mounted/dismounted information CD, that the navigation apparatus 1 is mounted on the cradle 4, the autonomic speed calculation unit 11 calculates the autonomic speed Vt based on the previously learned data (the tilt angle φ', swing angle θ' and pan angle ψ' representing the attachment angle of the acceleration sensor 14 with respect to the vehicle, and the zero point offset OFx, OFy and OFz of the acceleration sensor 14) when the GPS signals are not being received via the GPS antenna 2. This is because the sensor coordinate system, defined by the equation (6), is maintained.

Whereas if the autonomic speed calculation unit 11 recognizes, based on the supplied mounted/dismounted information CD, that the navigation apparatus 1 is dismounted from the cradle 4, the autonomic speed calculation unit 11 continues to output the recently calculated autonomic speed data Vt (or the latest speed data calculated by the autonomic speed calculation unit 11 while the navigation apparatus 1 was placed on the cradle 4) when the GPS signals are not received via the GPS antenna 2, based on the premise that the recently calculated autonomic speed Vt is maintained even after the apparatus 1 is dismounted from the cradle 4. This is because the sensor coordinate system, defined by the equation (6), is not maintained.

That is because it is expected that the vehicle's speed does not change abruptly. In this manner, the autonomic speed calculation unit 11 continues to output, as the second best policy, the previous autonomic speed data Vt, which may be less accurate than those calculated from the previously learned data.

In that manner, the navigation unit 12 can continue to calculate the current position even though it may be less accurate.

In addition, there is a possibility that the attachment angle of the navigation apparatus 1 with respect to the cradle 4 may vary each time the navigation apparatus 1 is mounted on the cradle 4 due to obstructions between the cradle 4 and the navigation apparatus 1, the position of the cradle 4 jolted and slightly moved away from its correct position and the like.

Accordingly, each time the navigation apparatus 1 is mounted on the cradle 4, the autonomic speed calculation unit 11 performs again the learning process using the previously learned data (or the data generated by the previous learning process before the navigation apparatus 1 was dismounted from the cradle 4) as the initial values.

In that manner, the autonomic speed calculation unit 11 again performs the learning process. This compensates for changes in the attachment angle. In addition, the autonomic speed calculation unit 11 is designed to use the previously learned data as the initial values for the next learning process. This improves efficiency in the learning process.

By the way, while the GPS signals are being received via the GPS antenna 2, the navigation unit 12 calculates the current position based on the position information PS supplied from the GPS processing section 10, in spite of whether the navigation apparatus 1 is placed on the cradle 4 or not.

In that manner, the autonomic speed calculation unit 11 checks if the navigation apparatus 1 is mounted on or dismounted from the cradle 4 in order to decide on whether to use the previously learned data. This enables the autonomic speed calculation unit 11 to continue to output the precise autonomic speed data Vt.

(4-2) Autonomic Speed Calculation Switching Process

Figure 11:
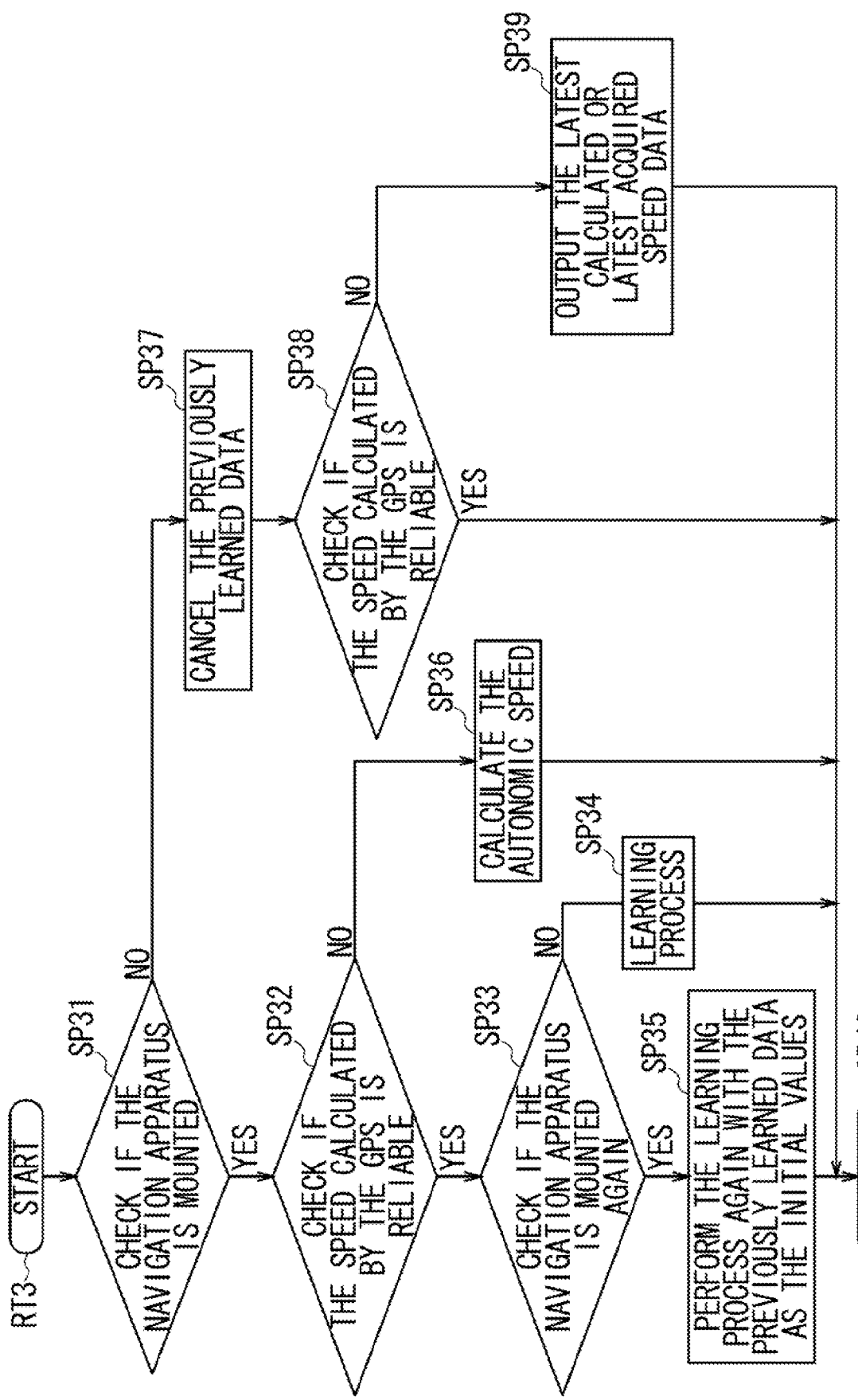
FIG. 11 is a flowchart illustrating a procedure of an autonomic speed calculation switching process.

In reality, the autonomic speed calculation unit 11 checks if the navigation apparatus 1 is mounted on the cradle 4 and also checks if the GPS signals are being received in order to select one of the following processes: the learning process or the autonomic speed calculation process. The autonomic speed calculation unit 11 performs a procedure RT3 of the autonomic speed calculation switching process as shown in FIG. 11.

The autonomic speed calculation unit 11 starts the process RT3 at certain intervals (e.g. 1 second). The autonomic speed calculation unit 11 proceeds to step SP31 to check if the navigation apparatus 1 is mounted on the cradle 4, based on the mounting/dismounting information CD supplied from the cradle mounting/dismounting detection section 16. If the autonomic speed calculation unit 11 determines that the navigation apparatus 1 is mounted on the cradle 4, then this means the sensor coordinate system is maintained. In this case, the autonomic speed calculation unit 11 proceeds to step SP32.

At step SP32, the autonomic speed calculation unit 11 checks if the speed information V, calculated by the GPS processing section 10 based on the GPS signals from the GPS satellites, is reliable or not, based on a flag attached to the speed information V. If the autonomic speed calculation unit 11 determines that it is reliable, then this means that the autonomic speed calculation unit 11 can perform the learning process. In this case, the autonomic speed calculation unit 11 proceeds to step SP33.

At step SP33, the autonomic speed calculation unit 11 checks how much time has passed since the navigation apparatus 1 was placed on the cradle 4, based on the last several seconds of the mounting/dismounting information CD or the like. If the autonomic speed calculation unit 11 determines that so much time has passed since the navigation apparatus 1 was placed on the cradle 4 and that the navigation apparatus 1 is still on the cradle 4, then this means the autonomic speed calculation unit 11 can continue to use the previously learned data. In this case, the autonomic speed calculation unit 11 proceeds to step SP34.

At step SP34, the autonomic speed calculation unit 11 starts the procedure RT1 of the learning process (FIG. 8) to update the learned data, and then proceeds to step SP40 to end the process.

Whereas if the autonomic speed calculation unit 11 determines that so much time has not passed yet since the navigation apparatus 1 was placed on the cradle 4, then this means the autonomic speed calculation unit 11 may need to learn again the attachment angle of the acceleration sensor 14 and the like. In this case, the autonomic speed calculation unit 11 proceeds to step SP35.

At step SP35, the autonomic speed calculation unit 11 reads out from the storage section 13 the previously learned data or the data calculated before the navigation apparatus 1 was dismounted from the cradle 4, and then performs the procedure RT1 of the learning process (FIG. 8), by using the previously learned data as the initial values, to obtain new data. The autonomic speed calculation unit 11 subsequently proceeds to step SP40 to end the process.

On the other hand, if the autonomic speed calculation unit 11 at step SP32 determines that the speed information V is not reliable, then this means the GPS signals are not being received due to the vehicle running inside a tunnel or the like. In this case, the autonomic speed calculation unit 11 proceeds to step SP36.

At step SP36, the autonomic speed calculation unit 11 performs the procedure RT2 of the autonomic speed calculation process (FIG. 10) to calculate the autonomic speed Vt and then proceeds to step SP40 to end the process.

On the other hand, if the autonomic speed calculation unit 11 at step SP31 determines that the navigation apparatus 1 is not on the cradle 4, then this means the sensor coordinate system is not maintained. In this case, the autonomic speed calculation unit 11 proceeds to step SP38 after canceling the previously learned data at step SP37.

At step SP38, in a similar way to the process of the step SP32, the autonomic speed calculation unit 11 checks if the speed information V, calculated by the GPS processing section 10 based on the GPS signals from the GPS satellites, is reliable or not, based on a flag attached to the speed information V.

If the automatic speed calculation unit 11 determines that the speed information V is reliable, then this means the autonomic speed calculation unit 11 does not have to calculate the autonomic speed Vt because the GPS signals are being received. In this case, the autonomic speed calculation unit 11 proceeds to step SP40 to end the process.

Whereas if the autonomic speed calculation unit 11 determines that the speed information V is not reliable, then this means the GPS signals are not being received. Which means that the autonomic speed Vt may not be able to be calculated from the acceleration sensor observation value AD from the acceleration sensor 14, because the sensor coordinate system is not maintained as noted above. In this case, the autonomic speed calculation unit 11 proceeds to step SP39.

At step SP39, the autonomic speed calculation unit 11 chooses the newer of the speed data as the autonomic speed data Vt, i.e., the recently calculated autonomic speed data Vt or the latest speed data V acquired from the GPS processing section 10. The autonomic speed calculation unit 11 subsequently proceeds to step SP40 to end the process.

After that, based on the autonomic speed data Vt supplied from the autonomic speed calculation unit 11, the navigation unit 12 calculates (or estimates) the current position, and then displays map information and route-guidance information on the display section 3.

(5) Operation and Effect

The autonomic speed calculation unit 11 of the navigation apparatus 1 checks if the navigation apparatus 1 is mounted on the cradle 4, based on the mounting/dismounting information CD from the cradle mounting/dismounting detection section 16.

If the autonomic speed calculation unit 11 recognizes, based on the supplied mounted/dismounted information CD, that the navigation apparatus 1 is mounted on the cradle 4, the autonomic speed calculation unit 11 calculates the autonomic speed Vt based on the previously learned data (the tilt angle φ', swing angle θ' and pan angle ψ' representing the attachment angle of the acceleration sensor 14 with respect to the vehicle, and the zero point offset OFx, OFy and OFz of the acceleration sensor 14) when the GPS signals are not being received via the GPS antenna 2.

Whereas if the autonomic speed calculation unit 11 recognizes, based on the supplied mounted/dismounted information CD, that the navigation apparatus 1 is dismounted from the cradle 4, the autonomic speed calculation unit 11 continues to output the recently calculated autonomic speed data Vt (or the latest speed data calculated by the autonomic speed calculation unit 11 while the navigation apparatus 1 was placed on the cradle 4) when the GPS signals are not received via the GPS antenna 2, based on the premise that the recently calculated autonomic speed Vt is maintained even after the apparatus 1 is dismounted from the cradle 4.

In this case, when the navigation apparatus 1 is dismounted from the cradle 4, the autonomic speed calculation unit 11 can recognize that the sensor coordinate system, defined by the above equation (6), is not maintained. The autonomic speed calculation unit 11 therefore stops calculating the autonomic speed Vt based on the previously learned data including the attachment angle of the acceleration sensor 14 (the tilt angle $\phi'$, the swing angle $\theta'$ and the pan angle $\psi'$).

Immediately after the cradle mounting/dismounting detection section 16 detects that the navigation apparatus 1 is dismounted from the cradle 4, the autonomic speed calculation unit 11 stops using the previously learned data. This prevents the navigation apparatus 1 from detecting, as the acceleration of the vehicle, the shock to the navigation apparatus 1 when the navigation apparatus 1 is dismounted from the cradle 4 by the user.

In that manner, the autonomic speed calculation unit 11 continues to output the previous autonomic speed data Vt, which may be less accurate than those calculated from the previously learned data. That is because it is expected that the vehicle's speed does not change abruptly.

On the other hand, if the autonomic speed calculation unit 11 recognizes that the navigation apparatus 1 is mounted on the cradle 4 again, the autonomic speed calculation unit 11 performs again the learning process by using the previously learned data (the data generated by the previous learning process before the navigation apparatus 1 was dismounted from the cradle 4) as the initial values.

In this case, the attachment angle of the apparatus 1 may be different from the last time. However, that compensates for this difference. In addition, using the previously learned data as the initial values improves efficiency in the learning process.

Accordingly, the navigation unit 12 can precisely calculate the current position even if the navigation apparatus 1 is dismounted from the cradle 4 or if the GPS signals are not being received.

According to the above configuration, the autonomic speed calculation unit 11 of the navigation apparatus 1 checks if the navigation apparatus 1 is mounted on the cradle 4, based on the mounting/dismounting information CD from the cradle mounting/dismounting detection section 16. If it determines that the navigation apparatus 1 is mounted on the cradle 4, the autonomic speed calculation unit 11 can precisely calculate the autonomic speed Vt based on the previously learned data. Whereas if it determines that the navigation apparatus 1 is dismounted from the cradle 4, the autonomic speed calculation unit 11 stops using the previously learned data to calculate the autonomic speed Vt because the sensor coordinate system is not maintained. This maintains the accuracy of the current position calculation by the navigation unit 12.

(6) Other Embodiment

In the above-noted embodiments, while the GPS signals are not being received after the navigation apparatus 1 is dismounted from the cradle 4, the autonomic speed calculation unit 11 chooses the newer of the speed data as the autonomic speed data Vt, i.e., the latest autonomic speed data Vt calculated by the autonomic speed calculation section 11 or the latest speed data V acquired from the GPS processing section 10. However, the present invention is not limited to this. The autonomic speed calculation unit 11 may calculate the rate of change of the speed V before the apparatus 1 is dismounted, in order to adjust the speed data based on the rate after the apparatus 1 is dismounted. Alternatively, the autonomic speed calculation unit 11 may stop outputting the autonomic speed data Vt. In that manner, the autonomic speed calculation unit 11 is designed to stop using the previously learned data (or the data calculated while the navigation apparatus 1 is placed on the cradle 4) after the navigation apparatus 1 is dismounted from the cradle 4.

Moreover, in the above-noted embodiment, after the navigation apparatus 1 is mounted on the cradle 4 again, the autonomic speed calculation unit 11 performs again the learning process by using the previously learned data as the initial values. However, the present invention is not limited to this. The autonomic speed calculation unit 11 may restart the learning process from scratch, including the calculation of the equation (16). Alternatively, the autonomic speed calculation unit 11 may calculate the autonomic speed Vt based on the previously learned data immediately after the navigation apparatus 1 is dismounted.

Furthermore, in the above-noted embodiment, the Newton-Raphson method (the equations (30) to (32)) is used to calculate the zero point offset OFx, OFy and OFz of the acceleration sensor 14 and the tilt angle $\phi'$, swing angle $\theta'$ and pan angle $\psi'$ representing the attachment angle of the acceleration sensor 14 with respect to the vehicle. However, the present invention is not limited to this. Other calculation methods may be used to calculate the zero point offset OFx, OFy and OFz of the acceleration sensor 14 and the tilt angle $\phi'$, swing angle $\theta'$ and pan angle $\psi'$ representing the attachment angle of the acceleration sensor 14 with respect to the vehicle.

Furthermore, in the above-noted embodiments, the equations (42) to (47) calculate the autonomic speed Vt. However, the present invention is not limited to this. Other calculation methods may calculate the autonomic speed Vt based on the acceleration sensor observation values ADx", ADy" and Adz". Those method may not use the altitude difference data $\Delta H$.

Furthermore, in the above-noted embodiments, the navigation apparatus 1 is attached to the vehicle (equivalent to a mobile object). However, the present invention is not limited to this. The navigation apparatus 1 may be attached to other mobile objects, such as ships, trains and the like.

Furthermore, in the above-noted embodiments, the GPS processing section 10 calculates the vehicle's speed data V and direction data D based on the GPS signals received via the GPS antenna 2 from the GPS satellites. However, the present invention is not limited to this. The GPS processing section 10 may calculate the vehicle's speed data V and direction data D by using other GPS satellite systems such as quasi-zenith satellite systems, Global Navigation Satellite System (GLONASS) or GALILEO.

Furthermore, in the above-noted embodiment, the autonomic speed calculation unit 11 executes the speed calculation program, read out from the ROM, to perform the autonomic speed calculation switching process (the routine RT3 in FIG. 11). However, the present invention is not limited to this. The speed calculation program may be supplied from a storage medium or via the Internet when the autonomic speed calculation unit 11 performs the autonomic speed calculation switching process (the routine RT3).

Furthermore, in the above-noted embodiments, the navigation apparatus 1 includes: a main unit, which is equivalent to the body of the navigation apparatus 1; the acceleration sensor 14, equivalent to an acceleration sensor; the autonomic speed calculation unit 11 and the navigation unit 12, which are equivalent to speed estimate means; the cradle mounting/dismounting detection section 16, equivalent to mounting detection section; and the autonomic speed calculation unit 11, which is equivalent to acceleration calculation means, attachment inclination calculation means and speed estimate control means. However, the present invention is not limited to this. The navigation apparatus may be configured in different manners to realize the functions of the main unit, acceleration calculation means, acceleration sensor, attachment inclination calculation means, speed estimate means, mounting detection section and speed estimate control means.

The method according to an embodiment of the present invention can be applied to a Personal Digital Assistant (PDA) device with GPS system, a mobile phone, a personal computer and the like, instead of the portable navigation apparatus to be attached to the inside of the vehicle through the cradle.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation apparatus comprising:
   a main unit to be attached to a mobile object through a predetermined base section on which the main unit is mounted, the main unit detecting a current position of the mobile object based on positioning information supplied from a predetermined positioning unit;
   an acceleration calculation unit for calculating acceleration applied to the mobile object based on the mobile object's speed calculated based on the positioning information;
   an acceleration sensor for observing acceleration applied to the main unit;
   an attachment inclination calculation unit for calculating an attachment inclination of the acceleration sensor with respect to the mobile object, based on the mobile object's acceleration and the observed acceleration;
   a speed estimate unit for estimating, while the positioning information is not being supplied, a speed and position of the mobile object, based on the observed acceleration and the attachment inclination;
   a mounting detection section for detecting whether the main unit is mounted on the base section; and
   a speed estimate control unit for forcing the speed estimate unit to stop estimating the speed when the mounting detection section detects that the main unit is not mounted on the base section.

2. The navigation apparatus according to claim 1, wherein the speed estimate control unit regards the latest speed estimated by the speed estimate unit as the current speed when the positioning information is not being supplied after the mounting detection section detects that the main unit is not mounted on the base section.

3. The navigation apparatus according to claim 1, wherein the speed estimate control unit regards the latest speed calculated from the positioning information as the current speed when the positioning information is not being supplied after the mounting detection section detects that the main unit is not mounted on the base section.

4. The navigation apparatus according to claim 1, wherein the attachment inclination calculation unit stops calculating the attachment inclination when the mounting detection section detects that the main unit is not mounted on the base section.

5. The navigation apparatus according to claim 1, wherein the attachment inclination calculation unit recursively calculates the attachment inclination by repeating an arithmetic process based on a predetermined initial value, and calculates, when the main unit is mounted on the base section again, the attachment inclination again by using the previous attachment inclination, calculated before the main unit was dismounted from the base section, as the initial value.

6. The navigation apparatus according to claim 1, further comprising
   an acceleration calculation unit for calculating the mobile object's acceleration in the direction of the mobile object's motion, based on the mobile object's speed calculated from the positioning information, and horizontal acceleration whose direction is perpendicular to the mobile object's motion, based on the mobile object's speed and direction calculated from the positioning information, wherein
   the acceleration sensor observes motion acceleration of the mobile object and gravity acceleration; and
   the attachment inclination calculation unit calculates, based on a road's altitude difference calculated based on an atmospheric pressure value from a predetermined barometric sensor and a travel distance corresponding to the mobile object's speed, an inclination angle of the road in the direction of the motion, and then calculates the attachment inclination by using a multidimensional function formula including the acceleration in the direction of the motion, the horizontal acceleration, values observed by the acceleration sensor and the inclination angle, the observed values including the motion acceleration and the gravity acceleration.

7. A position detection method comprising:
   detecting a current position of a main unit attached to a mobile object through a base section on which the main unit is mounted, based on positioning information supplied from a predetermined positioning unit;
   calculating acceleration applied to the mobile object based on the mobile object's speed calculated based on the positioning information;
   observing, by using an acceleration sensor, acceleration applied to the main unit;
   calculating an attachment inclination of the acceleration sensor with respect to the mobile object, based on the mobile object's acceleration and the observed acceleration;
   estimating, while the positioning information is not being supplied, a speed and position of the mobile object, based on the observed acceleration and the attachment inclination;
   detecting whether the main unit is mounted on the base section; and
   stopping the estimation of the speed when it is detected that the main unit is not mounted on the base section.

8. The position detection method according to claim 7, further comprising:
   regarding the last estimated speed as a current speed when the positioning information is not being supplied after detecting that the main unit is not mounted on the base section.

9. The position detection method according to claim 7, further comprising:
   regarding the latest speed calculated from the positioning information as the current speed when the positioning information is not being supplied after detecting that the main unit is not mounted on the base section.

10. The position detection method according to claim 7, wherein calculating the attachment inclination comprises stopping the calculation of the attachment inclination when it is detected that the main unit is not mounted on the base section.

11. The position detection method according to claim 7, wherein calculating the attachment inclination comprises recursively calculating the attachment inclination by repeating an arithmetic process based on a predetermined initial value, and calculates, when the main unit is mounted on the base section again, the attachment inclination again by using the previous attachment inclination, calculated before the main unit was dismounted from the base section, as the initial value.

12. The position detection method according to claim 7, further comprising:

calculating the mobile object's acceleration in the direction of the mobile object's motion, based on the mobile object's speed calculated from the positioning information, and horizontal acceleration whose direction is perpendicular to the mobile object's motion, based on the mobile object's speed and direction calculated from the positioning information, wherein the acceleration sensor observes motion acceleration of the mobile object and gravity acceleration; and calculating the attachment inclination comprises calculating, based on a road's altitude difference calculated based on an atmospheric pressure value from a predetermined barometric sensor and a travel distance corresponding to the mobile object's speed, an inclination angle of the road in the direction of the motion, and then calculates the attachment inclination by using a multi-dimensional function formula including the acceleration in the direction of the motion, the horizontal acceleration, values observed by the acceleration sensor and the inclination angle, the observed values including the motion acceleration and the gravity acceleration.

13. A navigation apparatus comprising:

a main unit to be attached to a mobile object through a predetermined base section on which the main unit is mounted, the main unit detecting a current position of the mobile object based on positioning information supplied from a predetermined positioning unit;

an acceleration calculation section that calculates acceleration applied to the mobile object based on the mobile object's speed calculated based on the positioning information;

an acceleration sensor that observes acceleration applied to the main unit;

an attachment inclination calculation section that calculates an attachment inclination of the acceleration sensor with respect to the mobile object, based on the mobile object's acceleration and the observed acceleration;

a speed estimate section that estimates, while the positioning information is not being supplied, a speed and position of the mobile object, based on the observed acceleration and the attachment inclination;

a mounting detection section that detects whether the main unit is mounted on the base section; and a speed estimate control section that forces the speed estimate section to stop estimating the speed when the mounting detection section detects that the main unit is not mounted on the base section.

* * * * *